United States Patent
Urzhumov

(10) Patent No.: US 10,468,776 B2
(45) Date of Patent: Nov. 5, 2019

(54) MEDICAL APPLICATIONS USING TUNABLE METAMATERIAL SYSTEMS AND METHODS

(71) Applicant: Elwha LLC, Bellevue, WA (US)

(72) Inventor: Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 90 days.

(21) Appl. No.: 15/587,131

(22) Filed: May 4, 2017

(65) Prior Publication Data

US 2018/0323511 A1    Nov. 8, 2018

(51) Int. Cl.
*H01Q 15/00*    (2006.01)
*H01Q 15/14*    (2006.01)
(Continued)

(52) U.S. Cl.
CPC .......... *H01Q 15/00* (2013.01); *H01Q 1/2225* (2013.01); *H01Q 1/273* (2013.01); *H01Q 3/2605* (2013.01); *H01Q 3/44* (2013.01); *H01Q 15/0086* (2013.01); *H01Q 15/10* (2013.01); *H01Q 15/141* (2013.01); *H01Q 21/06* (2013.01); *H01Q 21/061* (2013.01); *H02J 7/025* (2013.01); *H02J 50/12* (2016.02); *H02J 50/23* (2016.02); *H02J 50/80* (2016.02); *H02J 2007/0098* (2013.01)

(58) Field of Classification Search
CPC ............ A61N 1/36514; A61N 1/36585; A61N 1/3925; H01Q 15/00; H01Q 15/10; H01Q 15/141; H02J 50/12; H02J 50/90
USPC ........ 340/539; 342/368; 600/300; 607/6, 32, 607/60
See application file for complete search history.

(56) References Cited

U.S. PATENT DOCUMENTS 5,441,532 A *  8/1995 Fenn ................. A61N 5/02
                                                    600/412
6,492,942 B1 * 12/2002 Kezys ................. H01Q 3/26
                                                    342/368

(Continued)

OTHER PUBLICATIONS

Zhang et al.; "Optimal Load Analysis for a Two-Receiver Wireless Power Transfer System"; Wireless Power Transfer Conference (WPTC), 2014 IEEE 2014; pp. 84-87.

(Continued)

*Primary Examiner* — Carl H Layno
*Assistant Examiner* — Michael J Lau

(57) ABSTRACT

This disclosure provides systems and methods relating to medical devices that utilize dynamically tunable antennas comprising a plurality of sub-wavelength antenna elements. In various embodiments, impedance elements associated with the sub-wavelength antenna elements are dynamically tuned to control radiation patterns of a tunable antenna, such as a metamaterial surface antenna technology (MSA-T) antenna. The radiation patterns produced by the tunable antenna are used, for example, for sending a control signal to an implanted medical device, directly controlling the movement of a medical device, causing a medical device to perform a specific function, powering a medical device, and/or otherwise interacting a medical device. In some embodiments, the implanted medical device may also include an antenna, such as an MSA-T antenna, for receiving and/or sending beam-formed electromagnetic radiation.

42 Claims, 31 Drawing Sheets

(51) Int. Cl.
*H01Q 15/10* (2006.01)
*H01Q 21/06* (2006.01)
*H02J 50/12* (2016.01)
*H01Q 1/22* (2006.01)
*H01Q 1/27* (2006.01)
*H01Q 3/26* (2006.01)
*H01Q 3/44* (2006.01)
*H02J 7/02* (2016.01)
*H02J 50/80* (2016.01)
*H02J 50/23* (2016.01)
*H02J 7/00* (2006.01)

(56) References Cited

U.S. PATENT DOCUMENTS

| | | | |
|---|---|---|---|
| 6,533,733 B1* | 3/2003 | Ericson | A61B 5/0031 |
| | | | 128/903 |
| 6,879,693 B2* | 4/2005 | Miller | H04R 25/30 |
| | | | 381/312 |
| 7,256,753 B2* | 8/2007 | Werner | H01Q 5/0086 |
| | | | 343/756 |
| 7,924,226 B2 | 4/2011 | Soler Castany et al. | |
| 7,928,900 B2* | 4/2011 | Fuller | G01S 7/414 |
| | | | 342/175 |
| 8,471,776 B2* | 6/2013 | Das | H01Q 3/30 |
| | | | 343/770 |
| 8,504,138 B1* | 8/2013 | Pivonka | A61B 1/041 |
| | | | 600/407 |
| 8,776,002 B2* | 7/2014 | Formato | H01Q 1/36 |
| | | | 343/700 R |
| 8,847,840 B1* | 9/2014 | Diaz | H01Q 1/364 |
| | | | 343/793 |
| 9,252,492 B2 | 2/2016 | Alrabadi et al. | |
| 9,917,376 B2* | 3/2018 | Belmkaddem | H01Q 23/00 |
| 2003/0011515 A1* | 1/2003 | Warble | H01L 21/8258 |
| | | | 342/372 |
| 2003/0048223 A1* | 3/2003 | Kezys | H01Q 3/26 |
| | | | 342/368 |
| 2004/0162034 A1 | 8/2004 | Parker | |
| 2004/0201526 A1 | 10/2004 | Knowles et al. | |
| 2007/0288066 A1* | 12/2007 | Christman | A61N 1/37229 |
| | | | 607/60 |
| 2008/0015421 A1* | 1/2008 | Penner | A61B 5/00 |
| | | | 600/300 |
| 2008/0054899 A1 | 3/2008 | Aksoy et al. | |
| 2010/0022861 A1* | 1/2010 | Cinbis | A61B 5/0084 |
| | | | 600/325 |
| 2010/0136926 A1* | 6/2010 | Lackey | H04B 1/126 |
| | | | 455/78 |
| 2010/0262160 A1* | 10/2010 | Boyden | A61B 17/68 |
| | | | 606/130 |
| 2010/0262239 A1* | 10/2010 | Boyden | A61B 17/68 |
| | | | 623/16.11 |
| 2010/0301971 A1 | 12/2010 | Yonak et al. | |
| 2010/0324378 A1* | 12/2010 | Tran | A61B 5/0028 |
| | | | 600/301 |
| 2011/0087306 A1* | 4/2011 | Goossen | A61N 1/3718 |
| | | | 607/60 |
| 2011/0260920 A1* | 10/2011 | Dybdal | G01S 7/2813 |
| | | | 342/379 |
| 2013/0154558 A1* | 6/2013 | Lee | H04B 5/0037 |
| | | | 320/108 |
| 2014/0039277 A1* | 2/2014 | Abraham | A61B 8/0841 |
| | | | 600/301 |
| 2014/0056378 A1* | 2/2014 | Harel | H04B 7/0408 |
| | | | 375/267 |
| 2014/0128032 A1 | 5/2014 | Muthukumar | |
| 2014/0306784 A1* | 10/2014 | Broyde | H04B 1/18 |
| | | | 334/78 |
| 2014/0334565 A1* | 11/2014 | Tzanidis | H04B 7/0456 |
| | | | 375/267 |
| 2014/0340278 A1 | 11/2014 | Formato | |
| 2014/0340732 A1* | 11/2014 | Zhang | G02B 5/3083 |
| | | | 359/279 |
| 2015/0130285 A1* | 5/2015 | Leabman | H02J 17/00 |
| | | | 307/104 |
| 2015/0171516 A1* | 6/2015 | Chen | H01Q 3/00 |
| | | | 342/368 |
| 2016/0074196 A1* | 3/2016 | Forsell | A61F 2/004 |
| | | | 600/31 |
| 2016/0344240 A1* | 11/2016 | Yeh | A61N 1/3787 |
| 2017/0063344 A1* | 3/2017 | Broyde | H03H 11/30 |
| 2017/0063439 A1* | 3/2017 | Frank | H04B 7/0456 |
| 2017/0163327 A1 | 6/2017 | Yang et al. | |
| 2017/0356980 A1* | 12/2017 | Islam | G01S 5/02 |

OTHER PUBLICATIONS

PCT International Search Report; International App. No. PCT/US2018/053759; dated Jan. 31, 2019; pp. 1-3.

* cited by examiner

400

```
┌─────────────────────────────────────────────────┐
│ Determine A Scattering Matrix (S-Matrix) Of Field Amplitudes For │
│ Each Of A Plurality Of Lumped Ports, N, Associated With An       │
│ Antenna Device                                  │
│ 410                                             │
└─────────────────────────────────────────────────┘
                        │
                        ▼
┌─────────────────────────────────────────────────┐
│ Identify A Target Radiation Pattern Of The Antenna Device │
│ Defined In Terms Of Target Field Amplitudes In The S-Matrix For │
│ The At Least One Lumped External Port, $N_e$    │
│ 420                                             │
└─────────────────────────────────────────────────┘
                        │
                        ▼
┌─────────────────────────────────────────────────┐
│ Determine An Optimized Port Impedance Vector, $\{Z_n\}$, Of │
│ Impedance Values For Each Of The Lumped Antenna Ports, $N_a$, │
│ That Results In An S-Matrix Element For The At Least One │
│ Lumped External Port, $N_e$, That Approximates The Target Field │
│ Amplitude For An Operating Frequency            │
│ 430                                             │
└─────────────────────────────────────────────────┘
```

FIG. 4

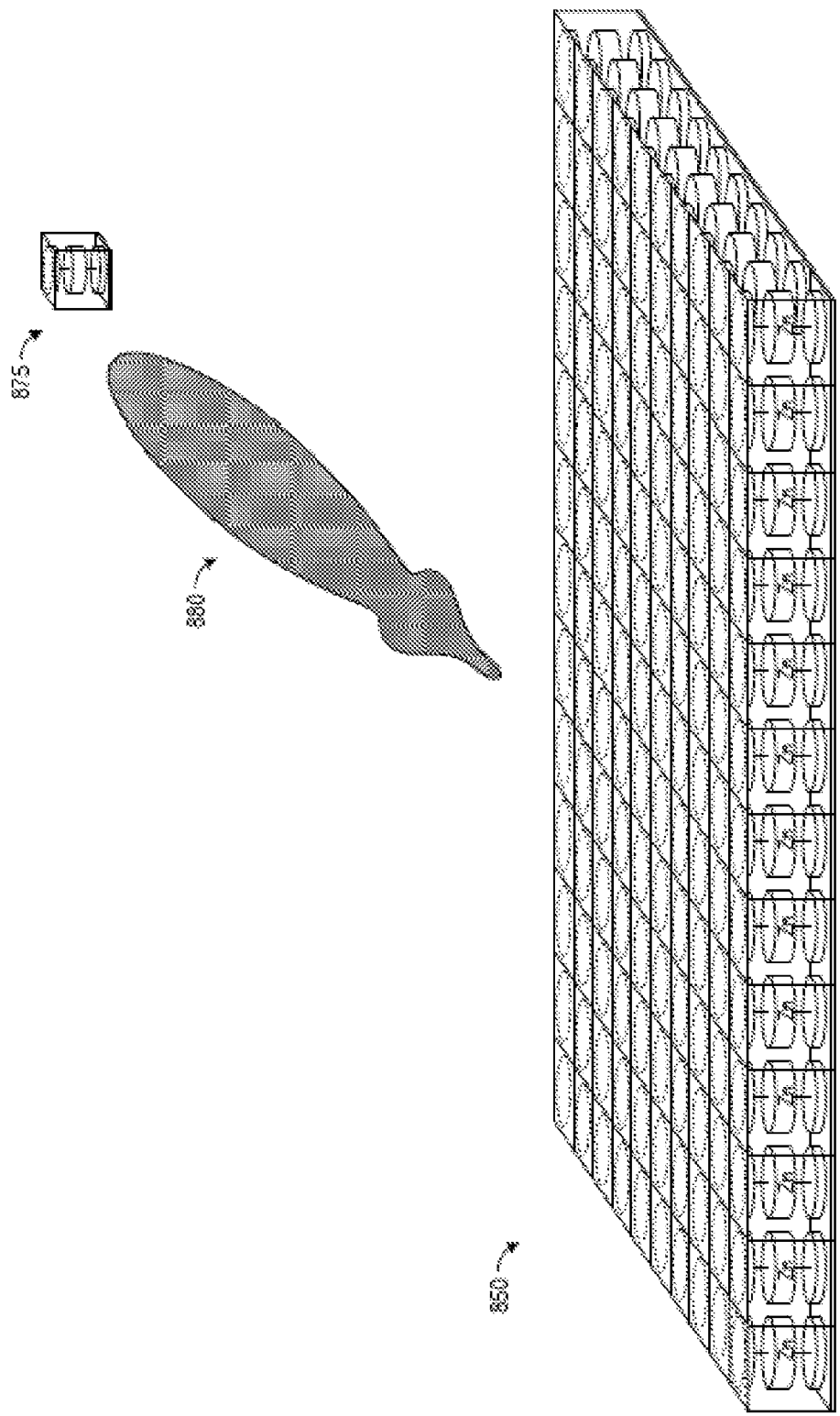

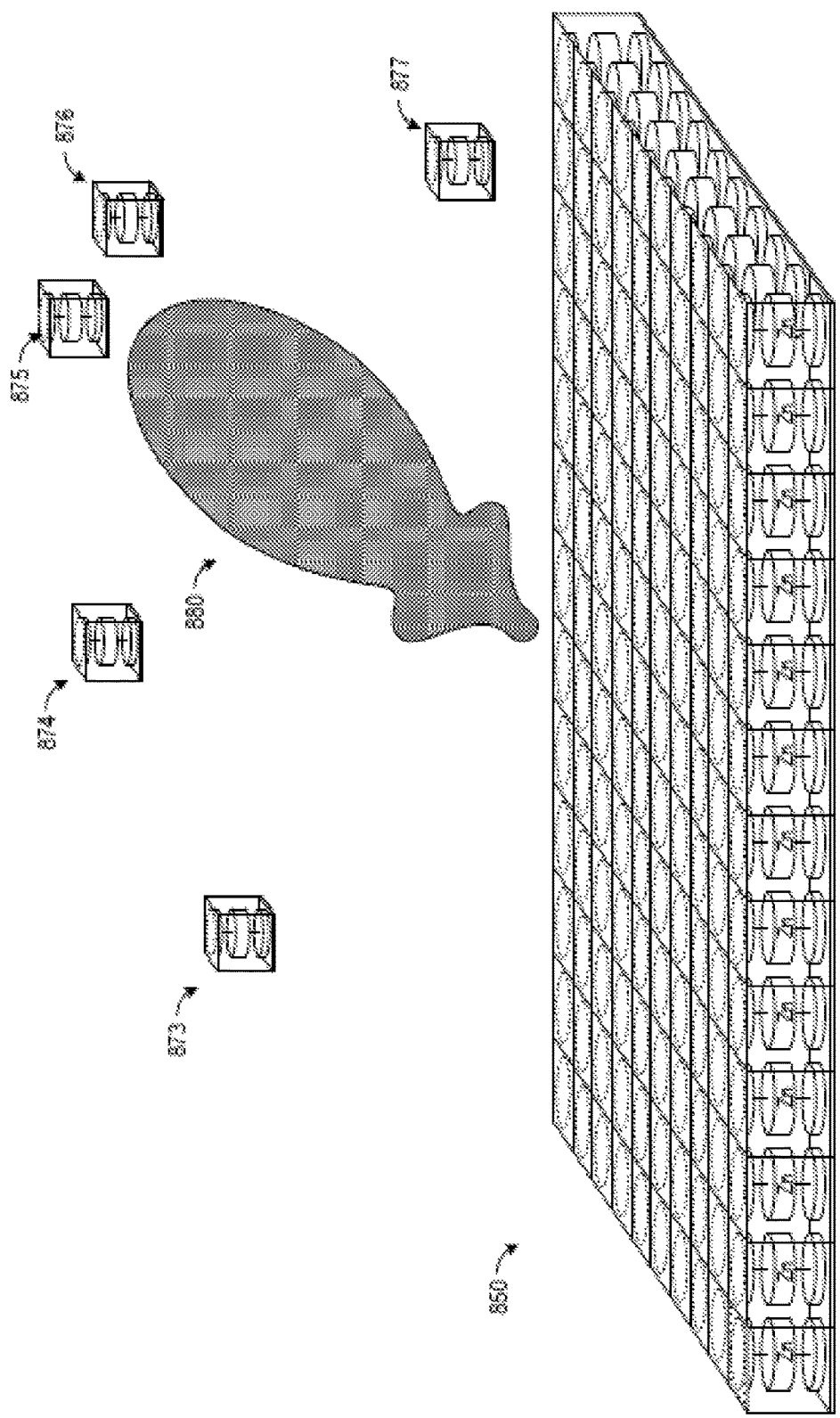

MEDICAL APPLICATIONS USING TUNABLE METAMATERIAL SYSTEMS AND METHODS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

None

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

The present disclosure generally relates to medical devices, imaging, and control systems. Specifically, this disclosure relates to systems and methods utilizing the optimization of variable impedance elements of tunable metamaterial devices to attain target radiation and/or field patterns for transmitting wireless power and/or control signals to medical devices.

BRIEF DESCRIPTION OF THE DRAWINGS

FIG. 4 is a flow chart of one embodiment of a method for radiation patterning by optimizing variable impedance values associated with an S-Matrix that includes at least one lumped port external to an antenna system.

FIG. 8B illustrates a radiation pattern formed to maximize a field amplitude of an S-Matrix element associated with an external port, $N_e$, located physically external to the antenna system by adjusting the impedance values associated with each of the lumped ports, $N_a$, defined by the sub-wavelength antenna elements and associated impedance elements, according to one embodiment.

FIG. 8C illustrates a radiation pattern formed to maximize a field amplitude of S-Matrix elements associated with two external ports, $N_e$, located physically external to the antenna system and by minimizing the field amplitude of three other external ports $N_e$, according to one embodiment.

DETAILED DESCRIPTION

Figure 1:
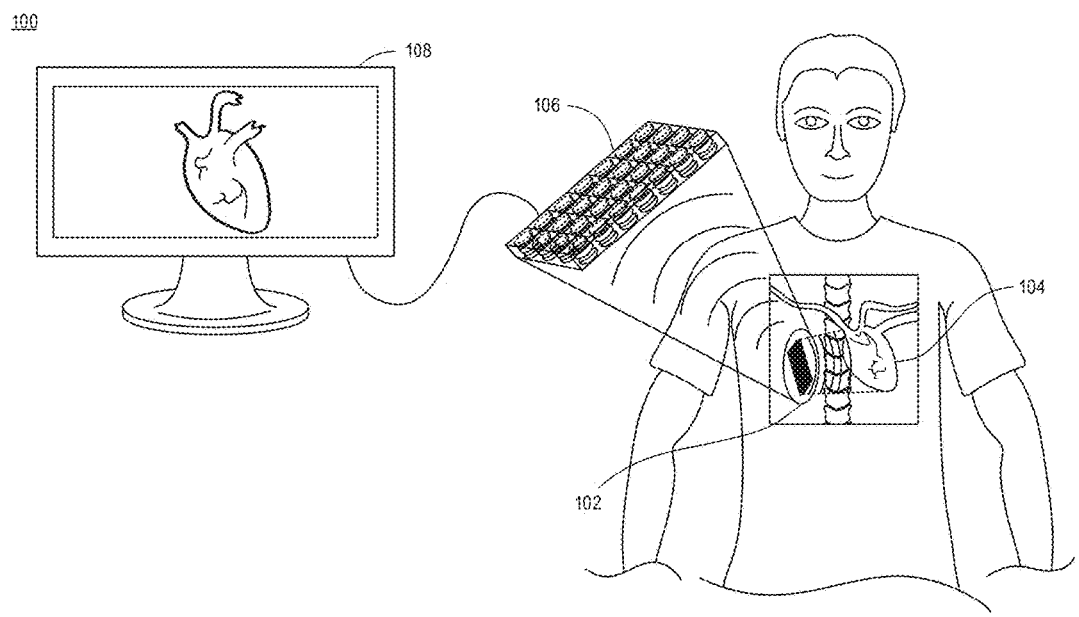
FIG. 1 is an embodiment of a wireless implantable medical device targeting an internal organ for radiation patterning.

The present disclosure provides various embodiments, systems, apparatuses, and methods that relate to radiation and electromagnetic field patterning in medical applications. Specifically, electromagnetic field patterning may be useful for providing wireless power, communicating control signals, and/or receiving data captured by the medical device. Tunable metamaterial devices may be used to solve various electromagnetic field-based issues. By tuning individual elements of a densely packed metamaterial array, a wide variety of customizable radiation patterns may be attained. In many instances of this disclosure, metamaterial elements are used as example embodiments of sub-wavelength antenna elements. It is, however, appreciated that any of a wide variety of sub-wavelength antenna elements may be utilized that may or may not be classified as metamaterials.

Exhaustive computations using traditional methods may be too computationally intensive and/or infeasible for real-time tuning and for switching. The complexity of the optimization problem may increase rapidly with the complexity of the medical application. In many embodiments, the complexity increases exponentially with the number of tunable or selectable elements in a medical device. Thus, standard optimization approaches for tuning elements of an array of sub-wavelength antenna elements may require cost functions to be evaluated a large number of times. The number of tunable elements of the antenna system may be expressed as the degrees of freedom (DoF) of an antenna device. The DoF may be based on the number of antenna elements, associated tunable elements, and/or other tunable or adjustable components associated with an antenna system. As the DoF increases, the complexity is likely to increase exponentially, leading to optimization problems for which global or even quasi-global solutions are prohibitively computationally expensive for even moderate device complexity.

The present systems and methods provide optimization solutions for arrays of antenna elements and associated tunable (i.e., variable) lumped impedance elements in which the optimization solutions are rational multivariate functions. Accordingly, globally optimal solutions may be found by solving optimization problems that scale linearly with the DoF. The optimization approach can be simplified by making the cost function dependent on one matrix-value input (such as an impedance matrix, Z-Matrix) that can be calculated by performing no more than N linear system simulations. In the present application, N is an integer corresponding to the number of variable (e.g., tunable) impedance elements associated with an antenna system.

The cost function, although still nonlinear, may have a specific rational form that permits exhaustive enumeration of all local extrema. A global maximum (or minimum) can be selected from the local extrema. For rational function, the extrema are found by solving multivariate polynomial equations. Root enumeration and/or numerical calculations of the multivariate polynomial equations may allow for specialized treatment.

Tunable metamaterials, including two-dimensional metasurface devices, may comprise an array of unit cells. Each unit cell may be modeled as a sub-wavelength antenna element associated with one or more variable impedance elements. Each variable impedance element may be associated with one or more sub-wavelength antenna elements. Each impedance element or group of impedance elements may be variably controlled based on one or more impedance control inputs. The tuning may be a dynamic process that occurs during operation by modifying one or more control inputs. In some instances, dynamic tuning during a medical procedure may not be necessary. In such embodiments, a one-time static tuning may be performed during the manufacturing of the antenna device. Related technology may be broadly referred to as metamaterial surface array technology (MSA-T) antennas.

As an example of static tunability, a metamaterial device may be manufactured using a 3D printer and the tuning may comprise selecting a material or combination of materials that results in a specific electromagnetic or electrical property for each of the impedance elements. By uniquely selecting the material or combination of materials for each of the unit cells, a metamaterial antenna device may be statically tuned to a specific radiation pattern. Alternatively, each unit cell may be modeled to include a lumped impedance element with (at least) one input and (at least) one output. The input(s) may be dynamically manipulated during operation to dynamically tune the antenna device in real-time to allow for a wide range of selectable target radiation patterns.

The antenna system may be modeled to include lumped impedance elements that can be passive, active, or variably passive-active. At a given frequency, each impedance element may be fully described by the complex value of its impedance "z." A positive integer N may be used to describe the number of tunable or variable lumped impedance elements in an antenna system. A diagonal square matrix of size N may have diagonal elements $z_n$ representative of the nth elements of the antenna system. Alternatively, an N-dimensional complex vector, $\{z_n\}$, can be used to represent the n-valued list of impedance values.

Each variable impedance element may be modeled as a port (e.g., a lumped port and/or a wave port). A plurality of lumped ports, N, may include a plurality of lumped antenna ports, $N_a$, with impedance values corresponding to the impedance values of each of the variable impedance elements, and at least one lumped external port, $N_e$, that may or may not have a variable impedance or any impedance at all. That is, the z value of the modeled lumped external port, $N_e$, may be zero and represent an idealized shorted port. Alternatively, the z value of the modeled lumped external port, $N_e$, may be infinity and represent an idealized open port. In many embodiments, the z value of the external port, $N_e$, may be a complex value with a magnitude between zero and infinity.

Regardless of the impedance values of each of the lumped ports, N, including the lumped antenna ports, $N_a$, and the at least one lumped external port, $N_e$, each of the lumped ports (or in some embodiments wave ports) may have its own self-impedance and the network of ports may be described by an N×N impedance matrix (Z-Matrix) or by the equivalent inverse admittance matrix (Y-Matrix) where $Y=Z^{-1}$. Additionally, the network of ports can be modeled as an S-parameter matrix or scattering matrix (S-Matrix). The Z-Matrix and its inverse the Y-Matrix are independent from the specific z values of the ports because the matrix elements are defined as $Z_{nm}=V_n/I_m$, where $V_n$ and $I_m$ are the voltage at port n and the current at port m, measured with all other ports open. That is, assuming port currents $I_k=0$ for all k not equal to m or n. Similarly, for the admittance matrix, $Y_{nm}=I_m/V_n$, measured with all other ports open. Again, that is assuming port currents $I_k=0$ for all k not equal to m or n.

The S-Matrix is expressible through the Z or Y matrices and the values of the lumped impedance elements as follows:

$$S=(\sqrt{y}Z\sqrt{y}-1)(\sqrt{y}Z\sqrt{y}+1)^{-1}=(1-\sqrt{z}Y\sqrt{z})(1+\sqrt{z}Y\sqrt{z})^{-1}$$

In the equation above, the "1" represents a unit matrix of size N. The S-Matrix models the port-to-port transmission of off-diagonal elements of the N-port antenna system. In a lossless system, the S-Matrix is necessarily unitary. If elements $s_n$ are the singular values of the S-Matrix, which are the same as the magnitudes of the eigenvalues, it can be stated that in a lossless system, all $s_n=1$. In general, if $s_{max}$ is the largest singular value, then for a passive lossy system it can be stated that $s_n \le s_{max} \le 1$.

In an active system, these bounds still hold, however $s_{max}$ can now exceed unity, representing an overall power gain for at least one propagation path. The Z and the Y matrices are diagonalized in the same basis represented by a unity matrix U ($U^\dagger = U^{-1}$), such that $Z=U^\dagger Z_d U$, $Y=U^\dagger Y_d U$, where the subscript d indicates a diagonal matrix, the elements of which are complex-valued eigenvalues of the corresponding matrix.

Generally speaking, unless $\sqrt{z}$ is proportional to a unit matrix (i.e., all lumped element impedances are equal), the S-Matrix will not be diagonal in the U-basis. In the U-basis, the general form of the S-Matrix is $S=U^\dagger(1-\zeta Y_d \zeta)(1+\zeta Y_d \zeta)^{-1}U$, where a new non-diagonal matrix $\zeta=U\sqrt{z}U^\dagger$ is used such that $\sqrt{z}=U^\dagger \zeta U$, and $Y_d$ is diagonal, though not generally commutative with $\zeta$.

The S-Matrix of the system can be numerically evaluated with any desired accuracy by solving exactly N linear system problems (e.g., $Z_{nm}=V_n/I_m$ or $Y_{nm}=I_m/V_n$ and the associated open port conditions described above). Such problems may be solved with Finite Element Methods (FEM) or finite-difference time-domain (FDTD) based solvers for linear electromagnetic systems. Examples of commercially available solvers include ANSYS HFSS, COMSOL, and CST. These numerical simulations incorporate various fine effects of the near-field and far-field interactions between various parts of the system, regardless of complexity.

The Z-Matrix and/or the Y-Matrix can be evaluated based on knowledge of the S-matrix and the impedance values. With many FEM solvers, it is also possible to directly evaluate the Z-Matrix or the Y-Matrix, by solving $N^2$ linear problems. This approach, however, is N times less efficient than calculating the S-Matrix with a fixed set of port impedance values (known as reference impedance values), and transforming it to Z and/or Y.

In various embodiments, an antenna system may include a plurality of sub-wavelength antenna elements. The sub-wavelength antenna elements may each have a maximum dimension that is less than half of a wavelength of the smallest frequency within an operating frequency range. One or more of the sub-wavelength antenna elements may comprise a resonating element. In various embodiments, some or all of the sub-wavelength antenna elements may comprise metamaterials. In other embodiments, an array of the sub-wavelength antenna elements (e.g., resonating elements) may be collectively considered a metamaterial.

In various embodiments in which at least some of the sub-wavelength antenna elements comprise resonating elements, the resonating elements may have quality factors exceeding 10, 100, or even 1000 depending on the application. Some resonating elements may include superconductors to achieve the specific quality factors.

The resonating elements may have at least one electric dipole resonance at a frequency within or proximate the operational frequency band. The resonating elements have at least one magnetic dipole resonance at a frequency within or proximate the operational frequency band. In various embodiments, the resonance frequencies of the resonating elements are controlled by the impedance values of the lumped impedance elements.

The sub-wavelength antenna elements may have inter-element spacings that are substantially less than a free-space wavelength corresponding to an operating frequency or frequency range. For example, the inter-element spacings may be less than one-half or one-quarter of the free-space operating wavelength. The inter-element spacings, or antenna element density, may be significant based on the intended use. For example, it is understood that a Gaussian beam is the tightest-waist beam possible given the laws of diffraction. The minimum waste diameter of a Gaussian beam is roughly one wavelength.

Many of the descriptions and illustrations provided herein are described relative to two-dimensional modeling (mathematically and/or graphically) that can be extrapolated for a three-dimensional model or system by one of skill in the art. Given the similarities between two-dimensional models and illustrations and three-dimensional models, the disclosure utilizes terms like "diameter" and "radius" that are applicable to the three-dimensional embodiments to describe attributes of the two-dimensional embodiments. Moreover, the discussion of antenna element density above may be understood with reference to the illustrations and two-dimensional descriptions as a linear density. However, it is appreciated that the same description can be understood in the context of a three-dimensional array of antenna elements as relating to a three-dimensional array of antenna elements.

In various embodiments, a waist equation for Gaussian beams may be used to determine the spot size (or two-dimensional equivalents) for various far-field propagation distances. The waist equation is given by:

$$w(z) = w_0 \sqrt{1 + \left(\frac{z}{z_R}\right)^2},$$

where $z_R = \pi w_0^2 / \lambda$ is the Rayleigh range. The Rayleigh range can be understood as approximately the same as the Fraunhofer/far-field distance for an aperture equal to the minimum waist size, $w_0$.

For metamaterial surface antennas utilizing an array of sub-wavelength antenna elements, diffraction still limits the minimum possible beam waist to about half-wavelength. To achieve Gaussian beams with the tightest possible waists, the spatial Fourier spectrum of the radiated mode must contain transverse wavenumbers close to maximum free space number with an accurate spectrum sampling. If the sub-wavelength antenna element spacing is approximately two per wavelength, then the waist of the minimum waist size of a generated beam will be relatively large. Such an embodiment with approximately two sub-wavelength antennas per wavelength would correspond well to a conventional phases array. Such an embodiment might be suitable for some far-field applications, but is less useable for radiative near-field applications.

In contrast, by increasing the element density to four, eight, or even more sub-wavelength antenna elements per wavelength, the tighter Gaussian beams can be formed with a greater power density concentrated within a minimum possible waste size.

The antenna system may be configured to operate in a wide variety of operating frequency ranges, including, but not limited to, microwave frequencies. The presently described systems and methods may be adapted for use with other frequency bands, including those designated as very low frequency, low frequency, medium frequency, high frequency, very high frequency, ultra-high frequency, super-high frequency, and extremely high frequency or millimeter waves.

In various embodiments, for efficient wireless power and/or communication transfer it may be desirable to utilize frequencies that propagate well within an expected usage environment. Molecular absorption and small-particle scattering increase rapidly with frequency. However, the smaller wavelengths (higher frequencies) allow for decreased aperture sizes of the array of sub-wavelength antenna elements. The tradeoff between keeping the aperture size small and having reasonably low attenuation may be decided on a case-by-case basis based on an expected usage environment and application sizing requirements. In some embodiments, the W-band may be particularly useful due to reduced atmospheric absorption between approximately 70 and 110 GHz. For example, frequencies between 93 and 96 GHz might be used in one particular embodiment.

Various embodiments, usage scenarios, applications, and system variables may make it desirable to operate a wireless power and/or communication transfer system in any of a wide variety of frequency ranges, including but not limited to the following known ranges: 30-300 kHz, 0.3-3 MHz, 3-30 MHz, ISM band (e.g., centered at 13.56 MHz), 6.78 MHz, and ISM band centered at 40.68 MHz. Additional possible operating frequency ranges include, but again are not limited to: between 300 MHz and 300 GHz, a decimeter wave frequency, the 2.45 GHz ISM band, a centimeter wave frequency, the 5.8 GHz ISM band, the 24.125 GHz ISM band, the 61.25 GHz ISM band, the 94-96 GHz atmospheric transparency window, and/or a millimeter wave frequency.

In some embodiments, each of the sub-wavelength antenna elements is associated with at least one lumped impedance element. A common transmission line (TL) may be coupled to the sub-wavelength antenna elements via the lumped impedance elements. Alternative waveguides may be used instead of or in addition to TLs. Each lumped impedance element may have a variable impedance value that may be at least partially based on the connected sub-wavelength antenna element(s) and/or a connected TL or other waveguide(s). A waveguide or TL may be modeled as another port in the S-Matrix in some embodiments, such as in Heretic-like architectures with variable couplers.

In other embodiments, an array or other plurality of sub-wavelength antenna elements may be configured to scatter received electromagnetic fields transmitted by an independent and/or separate antenna transmitter and/or to an independent and/or separate antenna receiver. Thus, for many of the various embodiments described herein, it is appreciated that the array or other plurality of sub-wavelength antenna elements may be used to directly transmit and/or receive electromagnetic radiation or alternatively scatter (in a controlled manner) electromagnetic radiation to or from another antenna. Thus, the electromagnetic fields received by the plurality of sub-wavelength antenna elements may be generated by a source external to the wireless transmitter or via a TL (e.g., a waveguide).

In embodiments in which the sub-wavelength antenna elements receive electromagnetic fields from a TL, the sub-wavelength antenna elements may receive the electromagnetic fields from one or locations on the TL to which the wireless transmitter is evanescently coupled. The sub-wavelength antenna elements may receive electromagnetic fields generated by a slot in a TL, an inductive element coupled to a TL, a capacitive element coupled to a transmission, and/or other combination of discretely coupled or integrated devices.

Examples of transmissions lines include, but are not limited to, rectangular waveguides, parallel-plate waveguides, microstrip lines, and coaxial lines. Electromagnetic fields may also be received for scattering by the plurality of sub-wavelength antenna elements from one or more of a short dipole antenna, a resonant dipole antenna, a have-wavelength dipole antenna, a loop antenna, a resonant loop antenna, a patch antenna, a horn antenna, and a dish antenna.

The impedance of each of the lumped impedance elements may be variably adjusted through one or more impedance control inputs. The number of sub-wavelength antenna elements, associated impedance elements, and the number of impedance control inputs may be a 1:1:1 ratio or an X:Y:Z, where X, Y, and Z are integers that may or may not be equal. For instance, in one embodiment there may be a 1:1 mapping of impedance elements to sub-wavelength antenna elements while there is only one-tenth the number of impedance control inputs.

In various embodiments, the modeled lumped external port, $N_e$, may or may not be associated with a variable impedance element. In some embodiments, the lumped external port, $N_e$, is modeled as an external port with an infinitesimal volume located at a particular radius vector relative to the antenna device. The lumped external port, $N_e$, may be in the far-field of the antenna device, the radiative near-field of the antenna device, or the reactive near-field of the antenna device.

In some embodiments, the lumped external port, $N_e$, may comprise a virtual port, an external region of space assumed to be a void, a region of space assumed to be filled with a dielectric material, and/or a location in space assumed to be filled with a conductive, radiative, reactive, and/or reflective material. In at least some embodiments, the lumped external port, $N_e$, comprises a receiving antenna.

The lumped external port, $N_e$, may also be modeled as a virtual external port, comprises a field probe, as measured by a non-perturbing measurement. In other embodiments, the virtual external port may represent a numerical field probe, as calculated using a numerical simulation. The field probe may correspond to a field amplitude measured by anon-perturbing measurement or a numerical field probe. The numerical field probe may correspond to an electromagnetic field amplitude calculated using a numerical simulation.

As previously described, in some embodiments, a unique lumped impedance element may be associated with each sub-wavelength antenna element. In other embodiments, a plurality of sub-wavelength antenna elements may be grouped together and associated with a single, variable, lumped impedance element. Conversely, a plurality of lumped impedance elements may be associated with a single sub-wavelength antenna element. In such an embodiment, the impedance of each of the plurality of lumped impedance elements may be controlled individually, or only some of them may be variable. In any of the above embodiments, X impedance control inputs may be varied to control the impedance of Y lumped impedance elements, where X and Y are integers that may or may not be equal.

As a specific example, 1,000 unique impedance control inputs may be provided for each of 1,000 unique lumped impedance elements. In such an embodiment, each of the impedance control inputs may be varied to control the impedance of each of the lumped impedance elements. As an alternative example, a binary control system with 10 inputs may control 1,000 unique lumped impedance elements to be variably addressed.

In some embodiments, one or more of the impedance control inputs may utilize the application of a direct current (DC) voltage to variably control the impedance of the lumped impedance element based on the magnitude of the applied DC voltage. In other embodiments, an impedance control input may utilize one or more of an electrical current input, a radiofrequency electromagnetic wave input, an optical radiation input, a thermal radiation input, a terahertz radiation input, an acoustic wave input, a phonon wave input, a mechanical pressure input, a mechanical contact input, a thermal conduction input, an electromagnetic input, an electrical impedance control input, and a mechanical switch input. In various embodiments, the lumped impedance elements may be modeled as two-port structures with an input and an output.

The lumped impedance elements may comprise one or more of a resistor, a capacitor, an inductor, a varactor, a diode, a MEMS capacitor, a BST capacitor, a tunable ferroelectric capacitor, a tunable MEMS inductor, a pin diode, an adjustable resistor, an HEMT transistor, and/or another type of transistor. Any of a wide variety of alternative circuit components (whether in discrete or integrated form) may be part of a lumped impedance element. A lumped impedance element may comprise a liquid-crystal-filled tunable capacitor, a liquid-crystal-filled tunable resonator, a split ring resonator, a spiral resonator, an electric inductor-capacitor (ELC or electric-LC) resonator, a complementary split ring resonator, a tunable ferroelectric capacitor, a tunable MEMS inductor, and/or a complementary ELC resonator.

In some embodiments, at least one of the lumped impedance elements may comprise a memory element, such as a volatile or non-volatile memory element. A volatile memory element may include a transistor, a capacitor, and/or a flip-flop circuit. Volatile memory elements may be addressable using, for example, row and column addressing schemes.

Similarly, at least one of the lumped impedance elements may comprise a non-volatile memory element. The non-volatile memory element may include a floating-gate transistor, a non-volatile ferroelectric RAM element, and/or a non-volatile magnetoresistive RAM element. Non-volatile memory elements may be addressable using, for example, row and column addressing schemes.

One or more of the lumped impedance elements may be connected to and collocated with a tunable microelectronic circuit. In various embodiments, some of the lumped impedance elements are connected to and collocated with tunable microelectronic circuits addressable using a row and column addressing-scheme. In some embodiments, one or more of the lumped impedance elements are connected to and collocated with a tunable microelectronic circuit located at the intersection of a word line and a bit line, and connected to both the word line and the bit line.

One or more hardware, software, and/or firmware solutions may be employed to perform operations for radiation patterning by controlling the impedance values of the lumped impedance elements via the one or more impedance control inputs. For instance, a computer-readable medium (e.g., a non-transitory computer-readable medium) may have instructions that are executable by a processor to form a specific radiation pattern. The executed operations or method steps may include determining the S-Matrix of field amplitudes for each of a plurality of lumped ports, N.

The lumped ports, N, may include a plurality of lumped antenna ports, $N_a$, with impedance values corresponding to the impedance values of the plurality of physical impedance elements. In at least some embodiments, the modeled lumped ports, N, include at least one external port, $N_e$, that is located physically external to the antenna system. In some embodiments, the lumped ports, N, also include a TL or other waveguide as another lumped port for the calculation of the S-Matrix.

As stated above, the S-Matrix is expressible in terms of an impedance matrix, Z-Matrix, with impedance values, $z_n$, of each of the plurality of lumped ports, N. Thus, by modifying one or more of the impedance values, $z_n$, associated with one or more of the plurality of lumped ports, N, a desired S-Matrix of field amplitudes can be attained. The operations or method steps may include identifying a target radiation pattern of the antenna system defined in terms of target field amplitudes in the S-Matrix for the at least one lumped external port, $N_e$.

An optimized port impedance vector $\{z_n\}$ of impedance values $z_n$ for each of the lumped antenna ports, $N_a$, may be calculated that results in S-Matrix elements for the one or more lumped external ports, $N_e$, that approximates the target field amplitude for a given operating frequency. Once an optimized $\{z_n\}$ is identified that will result in the desired field amplitude values for the S-Matrix elements of the one or more lumped external ports, $N_e$, the variable impedance control inputs may be adjusted as necessary to attain the optimized $\{z_n\}$.

As an example, a target field amplitude in the S-Matrix for a lumped external port, $N_e$, may correspond to a null in the field amplitude of the target radiation pattern. Alternatively, the target field amplitude in the S-Matrix for a lumped external port, $N_e$, may be maximized.

Any number of lumped external ports, $N_e$, may be used as part of the S-Matrix calculation. Using a plurality of lumped external ports, $N_e$, may allow for the definition of a radiation pattern having a plurality of side lobes, main lobes, and/or nulls. Thus, the S-Matrix may be calculated with a plurality of lumped external ports located external to the antenna device. The target field amplitudes in the S-Matrix for each of the lumped external ports may correspond to a target radiation pattern for the antenna device for a specific frequency range.

In various embodiments, at least one of the plurality of lumped antenna ports, $N_a$, is strongly mutually coupled to at least one other lumped antenna port, $N_a$. In some embodiments, at least one of the lumped external ports, $N_e$, is mutually coupled to one or more of the lumped antenna ports, $N_a$. Strongly mutually coupled devices may be those in which an off-diagonal Z-Matrix element $Z_{ij}$, is greater in magnitude than one-tenth of the max $(|Z_{ii}|, |Z_{jj}|)$.

Determining an optimized $\{z_n\}$ may include calculating an optimized Z-Matrix using one or more of a variety of mathematical optimization techniques. For example, the optimized $\{z_n\}$ may be determined using a global optimization method involving a stochastic optimization method, a genetic optimization algorithm, a Monte-Carlo optimization method, a gradient-assisted optimization method, a simulated annealing optimization algorithm, a particle swarm optimization algorithm, a pattern search optimization method, a Multistart algorithm, and/or a global search optimization algorithm. Determining the optimized $\{z_n\}$ may be at least partially based on one or more initial guesses.

Depending on the optimization algorithm used, the optimized values may be local optimizations based on initial guesses and may not in fact be true global optimizations. In other embodiments, sufficient optimization calculations are performed to ensure that a true globally optimized value is identified. In some embodiments, a returned optimization value or set of values may be associated with a confidence level or confidence value that the returned optimization value or set of values corresponds to global extrema as opposed to local extrema.

For gradient-assisted optimization, a gradient may be calculated analytically using an equation relating an S-parameter of the S-Matrix to the Z-Matrix and the optimized $\{z_n\}$. In some embodiments, a Hessian matrix calculation may be utilized that is calculated analytically using the equation relating the S-parameter to the Z-Matrix and the optimized $\{z_n\}$. A quasi-Newton method may also be employed in some embodiments. In the context of optimization, the Hessian matrix may be considered a matrix of second derivatives of the scalar optimization goal function with respect to the optimization variable vector.

In some embodiments, the global optimization method may include exhaustively or almost exhaustively determining all local extrema by solving a multivariate polynomial equation and selecting a global extremum from the determined local extrema. Alternative gradient-based methods may be used, such as conjugate gradient (CG) methods and steepest descent methods, etc. In the context of optimization, a gradient may be a vector of derivatives of the scalar optimization goal function with respect to the vector of optimization variables.

Splitting the domain based on expected roots and then splitting it into smaller domains to calculate a single root or splitting the domain until a domain with a single root is found may exhaustively determine all local extrema. Determining the optimized $\{z_n\}$ may include solving the optimization problem in which a simple case may include a clumped function scalar function with one output and N inputs. The N inputs could be complex $z_n$ values and the optimized Z-Matrix may be calculated based on an optimization of complex impedance values of the $z_n$ vectors.

The optimized $\{z_n\}$ may be calculated by finding an optimized Z-Matrix based on an optimization of complex impedance values $z_n$, roots of complex values of the impedance values $z_n$, reactances associated with the impedance values of the impedance values $z_n$, or resistivities associated with the impedance values of the impedance values $z_n$. The optimization in some embodiments may be constrained to allow only positive or inductive values of reactances, or only negative or capacitive values of reactances. In other embodiments, the optimization of resistivities may be constrained to only allow for positive or passive values of resistivities.

The optimized $\{z_n\}$ may also be calculated by finding an optimized Z-Matrix based on an optimization of the impedance control inputs associated with the lumped impedance elements of each of the sub-wavelength antenna elements, or by optimizing a nonlinear function. The nonlinear function may relate impedance values for each of the lumped antenna ports, $N_a$, as modeled in the S-Matrix and the associated impedance control inputs. In some embodiments, the nonlinear function may be fitted to a lower-order polynomial for optimization.

Mapping the Z-Matrix values to the S-Matrix values may comprise a non-linear mapping. In some instances, the mapping may be expressible as a single- or multivariate polynomial. The polynomial may be of a relatively low order (e.g., 1-5). The S-Matrix may comprise N values and the Z-Matrix may comprise M values, where N and M are both integers and equal to one another, such that there is a 1:1 mapping of S-Matrix values and Z-Matrix values. Any of a wide variety of mappings is possible. For example, the S-Matrix may comprise N values and the Z-Matrix may comprise M values, where N squared is equal to M. Alternatively, there may be a 2:1 or 3:1 mapping, or a 1:3 or 2:1 mapping.

The physical location of the at least one lumped external port, $N_e$, may be associated with a single-path or multipath propagation channel that is electromagnetically reflective and/or refractive. The multipath propagation channel may be in the near-field. In a radiative near-field, the multipath propagation pattern may be in the reactive near-field.

As previously described, the field amplitudes in the S-Matrix may be used to define a target radiation pattern. In some embodiments, the target radiation pattern of the antenna device may be defined in terms of target field amplitude for a single linear field polarization. The target radiation pattern may be defined in terms of a plurality of field amplitudes for a plurality of lumped external ports, $N_e$. The target radiation pattern may be defined in terms of target field amplitude for at least two linear polarizations.

The target field amplitudes for one or more lumped external ports, $N_e$, may be selected to decrease far-field sidelobes of the antenna device, decrease a power level of one or more sidelobes of the antenna device, change a direction of a strongest sidelobe of the antenna device, increase a uniformity of a radiation profile in the near-field, and/or minimize a peak value of field amplitudes in the near-field. The system may utilize a minimax approximation algorithm to minimize a peak value of field amplitudes in the near-field.

Determining the optimized $\{z_n\}$ of impedance values for each of the lumped antenna ports, $N_a$, may include determining an optimized set of control values for the plurality of impedance control inputs that results in a field amplitude for the at least one lumped external port, $N_e$, in the S-Matrix that approximates the target field amplitude for a given operating frequency or frequency range.

In conformity with the antenna systems and associated methods described above, a plurality of lumped antenna ports, $N_a$, with impedance values corresponding to the impedance values of each of the plurality of lumped impedance elements may be considered jointly with one or more external ports, $N_e$, whose purpose is to account for the field intensity at a particular location exterior to the antenna system. The external port, $N_e$, may represent an actual receive antenna, in which case a known input impedance of that port may be assigned to the external port, $N_e$. In other embodiments, the one or more external ports, $N_e$, may be merely conceptual and used to quantify one or more field intensities at one or more locations. The external port, $N_e$, may be assumed infinitesimal in area and/or volume and located at a particular radius vector.

Regardless of the number of external ports, $N_e$, the total number of ports N will correspond to the number of lumped antenna ports, $N_a$, and the number of external ports, $N_e$. In some embodiments, a common port (e.g., a waveguide or TL) associated with the antenna system may also be considered. In any such embodiments, the total size of the system matrices will be generally of size N, which does not grow exponentially with the degrees of freedom or number of variable impedance elements.

The S-Matrix element $|S_{1N}|^2$ represents the complex magnitude of a field (e.g., electric field) at a particular location in space, given by the radius vector $\vec{r_o}$, normalized to the field magnitude at the input port. The absolute value $|S_{1N}|$, or the more algebraically convenient quantity $|S_{1N}|^2$, quantifies the quality of field concentration at that point. Maximizing this quantity (or minimizing in the case of forming nulls) represents a generalized beamforming algorithm.

In some embodiments, the point $\vec{r_o}$ is in the far-field of the rest of the system, and the algorithm yields directive beams in the far-field. In other embodiments, the point $\vec{r_o}$ is in the radiative near-field of the rest of the system, and the algorithm yields field focusing to that point. In still other embodiments, the point $\vec{r_o}$ is within the reactive near-field of at least one part of the rest of the system, and the algorithm maximizes electric field intensity and electric energy density at that point.

To find all local optima and the global optimum we can use the equation $q_n = \sqrt{z_n}$, which characterizes the individual impedances $z_n$. The equation above, $S = U^\dagger(1-\zeta Y_d\zeta)(1+\zeta Y_d\zeta)^{-1}U$, is a rational (and meromorphic) analytical function of $\{q_n\}$.

To make this function bounded, and find its maxima that are attainable in a passive system, the function may be restricted to the multidimensional segment satisfying $Re(z_n) \geq 0$, n=1, ..., N. Equivalently, this condition is $$-\frac{\pi}{2} \leq \arg z_n \leq \frac{\pi}{2},$$

and consequently $$-\frac{\pi}{4} \leq \arg q_n \leq \frac{\pi}{4}.$$

To reduce this problem to real values, each $q_n$ variable can be expressed through real variables, $q_n = \rho_n + i\xi_n$. In this manner, the real valued function $|S_{1N}|^2$ is now a function of 2N real variables $\rho_n, \xi_n$, which is a rational function comprising a ratio of two 2N-variate polynomials.

In some embodiments, the resistance of each lumped element can be neglected by assuming $Re(z_n)=0$, $z_n = ix_n$, with the real reactance values $x_n$. In such embodiments, the system as a whole is still assumed passive and lossy with the losses occurring on the paths between the ports and incorporated into the Z-Matrix (or Y-Matrix). This approximation satisfies the passivity constraints and also reduces the number of variables to N because $\sqrt{z}Y\sqrt{z} \to i\sqrt{x}Y\sqrt{x}$, and x is purely real.

The function $|S_{1N}|^2$ is necessarily bounded for a passive system, and therefore it has a finite global maximum as a function of real-valued variables $\rho_n, \xi_n$. Moreover, it has a finite number of local extrema. These extrema can be found by solving a set of 2N multivariate polynomial equations given by the standard zero gradient condition at the extremum:

$$\frac{\partial |S_{1N}|^2}{\partial \rho_n} = 0, \frac{\partial |S_{1N}|^2}{\partial \xi_n} = 0, n = 1, \ldots, N.$$

In the simplified approach above, there are N unknowns $X_n = \sqrt{x_n}$ and N extremum conditions, so $$\frac{\partial |S_{1N}|^2}{\partial x_n} = 0, n = 1, \ldots, N.$$

Once these extrema are found, the external values of the function are evaluated numerically, and the global maximum is determined by choosing the largest local maximum. A similar approach can be performed to identify one or more minimums to attain a target radiation pattern with a null at one or more specific radius vectors $\vec{r_o}$.

Numerical and symbolic-manipulation algorithms exist that take advantage of the polynomial nature of the resulting equations. For example, Wolfram Mathematica™ function Maximize supports symbolic solving of the global optimization problem for multivariate polynomial equations, unconstrained or with multivariate polynomial constraints. This function is based on a Groebner-basis calculation algorithm, which reduces the multidimensional polynomial system to a triangular system, which is then reduced to a single scalar polynomial equation by back-substitution. Similar functionality exists in other software packages, including MATLAB™ with Symbolic Math Toolbox™, Maple™ and so on.

As previously discussed, once values are determined for each of the $z_n$ for the variable or tunable lumped impedance elements associated with the sub-wavelength antenna elements, each of the impedance elements can be tuned in real-time. In some embodiments, a physical stimulus (e.g., mechanical, electric, electromagnetic, and/or a combination thereof) may be used to dynamically tune impedance elements to dynamically modify the radiation pattern of the antenna system during operation.

Depending on the manufacturing techniques employed (e.g., 3D printing) the calculated values of optimum impedance values may translate trivially into the choices made for the selectable impedance elements. In contrast, for the dynamically adjustable, variable, or tunable impedance elements, there is generally a non-trivial relationship between the complex impedance of the elements and the stimuli that control them.

In some embodiments, the relationship between the complex impedance of the impedance elements and the control inputs may be based on a magnitude of an applied signal. Appreciating that the magnitude of the stimulus may be binary in some embodiments (i.e., on or off), the relationship may be modeled as $z_n = f_n(s_n)$, where $S_n$ is the real-valued magnitude of the stimulus. The function $f_n(s_n)$ can be fitted with a polynomial order S, and substituted into $|S_{1N}|^2$. The functions $f_n$ can be all the same when identical dynamically tunable elements are used, in which case there will be N extremum conditions for N real variable $s_n$, each of which is still a rational function.

In the lowest-order approximation, the fitting polynomial can be linear (S=1), in which case the complexity of the extremum problem is still $$\frac{\partial |S_{1N}|^2}{\partial x_n} = 0, n = 1, \ldots, N.$$

The quality of a polynomial approximation depends greatly on the practically available range of the stimulus, or the range chosen for other practical considerations. Because the $s_n$ variables are restricted to a finite interval, the optimization problem can be solved with the corresponding constraints. Exhaustive enumeration of the extrema can be used to solve the optimization problem, after which these constraints are applied trivially and the local extrema not satisfying the constraints are excluded from the enumeration.

A wide range of adaptive beamforming applications within a medical system are contemplated and made possible using the systems and methods described herein. For example, in some embodiments, beamforming may include a multipath propagation channel involving one or more reflective, refractive, or generally scattering object. In many embodiments, the relevant properties of the multipath propagation channel are incorporated into the Z-Matrix. Numerical simulations that lead to a calculation of the Z-Matrix may include a model of such a channel. A model of the multipath propagation channel can be simulated using any of a wide variety of simulation software packages, including, for example, ANSYS HFSS, COMSOL RF, CST MWS, etc.

In some embodiments, a particular linear field polarization can be achieved by considering the output port to be a port susceptible to only one linear polarization. For instance, a lumped (electrically small, single-mode) port is susceptible to a linear polarization with the electric field directed across the gap of the port.

In some embodiments, a target radiation pattern may be identified that includes a combination of two linear polarizations, including without limitation a circular polarization, that can be achieved by considering two co-located output ports, each of which is susceptible to only one linear polarization. In such an embodiment, adding additional external ports, $N_e$, may slightly increase the system matrices, but the addition of a few external ports increases the complexity by a relatively small constant value and will not change the general course of the algorithms and methods described herein.

In some embodiments, considering M output ports located in different directions with respect to the rest of the system can form multiple beams simultaneously (the process known as multi-beam forming). The size of the system matrices may then correspond to $N=Na+M+1$, which does not change the general course of the algorithm and does not exponentially increase the complexity.

As previously discussed, considering a minimization problem for the rational function of the equation above can form approximate nulls of the field either in the far-field or near-field. Similarly, maximizing the function $F=|S_{1,N}|^2 - \alpha|S_{1,N+1}|^2$, where the $N^{th}$ port measures the field intensity in one direction, the $(N+1)^{th}$ port measures field intensity in a specified sidelobe direction, and $\alpha$ is a selectable weight coefficient reflecting the degree to which sidelobe suppression should be achieved can attain a required level of sidelobe suppression for a target radiation pattern.

It is appreciated that the equation above can be readily generalized to include any number of sidelobes in any number of directions. Thus, it is appreciated that instead of optimizing the impedance values themselves, a function relating the impedance control inputs to the impedance values of the variable (i.e., tunable) impedance elements may be substituted into the equations to allow for the direct optimization of the impedance control inputs.

The presently described systems and methods may be used to form beams or pattern radiation generation or scattering to optimize wireless power transfer between a transmitting antenna system and one or more receivers. Similarly, multiple transmitting antennas may be used to power a single receiver. The number of receivers to transmitters used for wireless power transfer may be N:M where N and M are integers that are not necessarily equal. The system may utilize the N transmitters and the M receivers and determine how to efficiently transmit power from the N transmitters to the M receivers in an efficient manner.

In one embodiment, the target electromagnetic radiation pattern is selected to optimize a power transfer from a first group of sub-wavelength antenna elements to an external lumped port that is collocated with a second group of sub-wavelength antenna elements. The first group of sub-wavelength antenna elements may be facing the second group of sub-wavelength antenna elements and/or may be mobile with respect to the second group of sub-wavelength antenna elements. In other embodiments, the second group of sub-wavelength antenna elements may be mobile with respect to the first group of sub-wavelength antenna elements.

Optimizing the power transfer may include maintaining the power transferred to a selected external lumped port above or below a threshold level. For example, certain efficiencies might be attained above and/or below certain threshold levels. In cold situations, maintaining a transfer above at threshold level may prevent freezing and/or maintain various components of a charging or power system above a predetermined temperature.

Maintaining the power transfer below a threshold level may be beneficial, for example, to avoid overexposing objects, equipment, or living things to power densities greater than a predetermined threshold within a region of space. Optimization may also be based on the amount of heat generation associated with the power transfer above or below a threshold level. For example, maintaining power transfer above a predetermined level may be necessary to ensure that a liquid crystal based technology remains sufficiently warm to operate as intended.

In some embodiments, optimizing the power transfer may include minimizing the power transferred to one lumped external port while maintaining the power transferred to another lumped external port at or above a threshold level. The second lumped external port may be a virtual port corresponding to a location of a human (or portion thereof) or a location of a device (or portion thereof). In some embodiments, a receiver may communicate with a transmitter to ensure threshold levels are not exceeded.

As mentioned above, optimization may include maintaining the power transfer below a threshold level within a region of space. Having one or more dynamic exclusion zones may enable a wireless power transfer system to specifically limit the power density for given regions of space. Such exclusion zones may be dynamic in that they may change as the antenna (transmitter and/or receiver) moves and/or as other objects, equipment, and/or persons move within the environment. Identifying the zones that should be excluded may be a different problem solved in any number of ways as compared to the wireless power transfer system's ability to create such zones of exclusion.

Examples of components and devices that may be associated with a wireless power receiver include, but are not limited to, battery charging stations, cells within a battery, a rectifying circuit, personal electronic devices, cell phones, laptops, tablets, transformer circuits, frequency converter circuits, multiplier circuits, components of motor/electric/hybrid/fuel-cell vehicles, remotely operated vehicles, medical implants, and/or a medical device temporarily or permanently residing within a patient (e.g., within a lumen of a human).

The presently described systems and methods may be used for beamforming to generate a radiation pattern or scattering between a transmitting antenna and one or more receivers to optimize or balance a wide variety of systems for powering, controlling, and communicating with medical device, including without limitation and one or more the following: 1) radiofrequency imaging, 2) communication between a medical implant (or other inserted device) and a control system, 3) wireless power transfer to a medical implant, 4) direct ultrasound generation, 5) ablation, 6) MRI imaging using pulse shaping, 7) magnetic stimulation, and 8) implant propulsion. Thus, an external interface device may control, provide power to, send data to, or receive data from an implanted medical device. The medical device may be configured to perform a function with the patient related to any combination or permutation of the functions described above.

The external interface device may include an antenna comprising a plurality of sub-wavelength antenna elements for beamforming, as described herein. The implanted medical device may also include an antenna comprising a plurality of sub-wavelength antenna elements for beamforming, as described herein. One or both devices may have a controller to control the beamforming by adjusting variable impedance elements. In some embodiments, one of the external interface device and the implanted medical device may have static impedance values associated with the sub-wavelength elements of its antenna. In such an embodiment, the controller within the other device with the variable impedance elements may utilize the known static impedance values in the other device for beam forming calculations.

As used herein, the term "medical device" includes, but is not limited to, wireless implantable medical devices that may be inserted either partially or completely into a human or animal body (e.g., surgically). Such devices may utilize electric, magnetic, and/or other forces for medical purposes, and may remain inside the body for a period of time ranging from several minutes to several years. Medical devices benefiting from wireless control, power, and data communication include a wide variety of devices used for one or more of: prevention; diagnostics; treatment; medical assessments or investigations; monitoring of injuries or health conditions; replacing, modifying, or maintaining anatomical structures and/or physiological functions; and/or a variety of other health-related purposes.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like.

A processor may include a special-purpose processing device, such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In many instances, well-known structures, materials, or operations are not shown or described in detail to avoid obscuring aspects of this disclosure.

FIG. 1 illustrates a simple example embodiment of a medical system 100 comprising a wireless implantable medical device 102 targeting an internal organ 104 for radiation patterning. The relative sizes and placements of the elements and devices in FIG. 1 are intentionally exaggerated and are not intended to convey or suggest any specific information. The medical device 102 may be an active or passive implantable medical device 102 that performs actions in response to instructions and/or transmits data to an external device 106. The medical device 102 may include a housing of biocompatible material and have a major axis. The medical device 102 may be configured to transmit electromagnetic energy via an antenna system comprising an array of sub-wavelength antenna elements and associated variable lumped impedance elements. In one embodiment, the housing includes an electromagnetically transparent or semitransparent portion at the relevant wavelengths that reduces potential beamforming disruptions but protects the antenna array from direct contact with bodily fluids and/or tissues.

In one embodiment, the medical device 102 may be included in an imaging system 108 as part of the medical system 100 wherein the medical device 102 is an external portion of a multiple-input and multiple-output system. In one embodiment, the imaging system 108 may send and/or receive a plurality of data signals simultaneously via multipath propagation. Additional functionality and details regarding the functionality of the simplified embodiment in FIG. 1 are described below.

Figure 2:
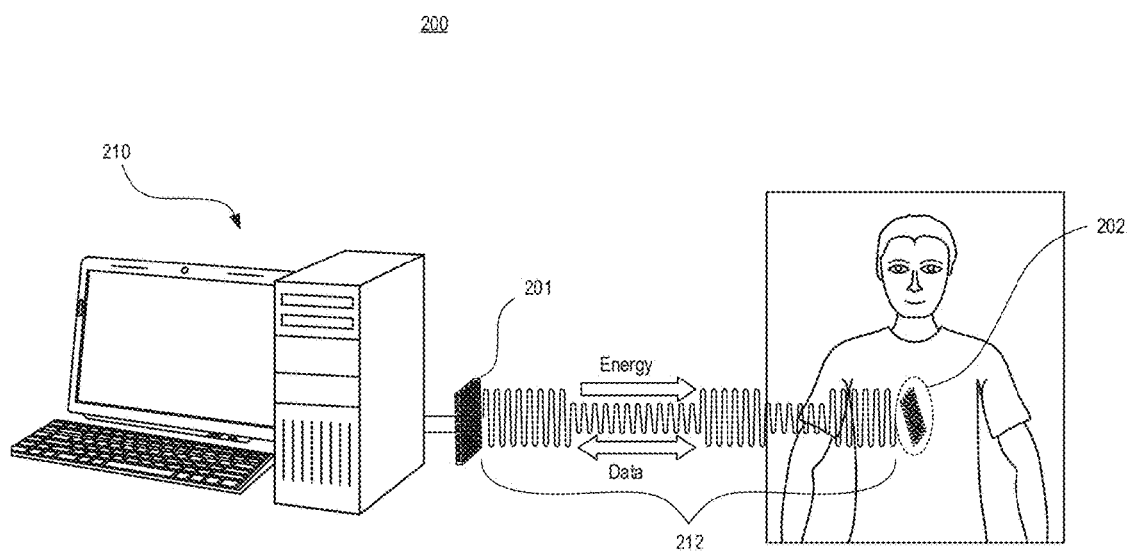
FIG. 2 is an embodiment of a wireless medical system utilizing one or more antennas with sub-wavelength antenna elements for powering and/or communicating with an embedded medical device.

FIG. 2 is another simplified embodiment of a wireless medical system 200 with a wireless medical device 202 in communication with a control system 210 (e.g., an external interface device). Again the example embodiment is merely provided as an example application of the systems and methods described herein and is not intended to convey any specific information regarding size, placement, or function of medical devices. An antenna system within the medical device 202 may communicate 212 via one or more antennas having a plurality of tunable sub-wavelength antenna elements. Active communication 212 may occur when a medical device 202 comprises a power and/or current source that is activated when in the presence of a control system 210. The control system 210 may include an interrogator and/or reader 201 to emit a signal that the wireless medical device 202 detects. Once the power and/or current source within the wireless medical device 200 is activated, the wireless medical device 200 may then actively transmit data to the control system 210.

In another embodiment, the medical device 202 may communicate with the control system 210 using power provided by the control system via the interrogator and/or reader 201. Passive communication 212 may occur when the control system 210 emits interrogating radio waves that identify a tag (e.g., an RFID tag) associated with the medical device 202. The tag may, according to one embodiment, include an integrated circuit for storing and/or processing information, modulating and demodulating the radio energy transmitted by the control system 210, collecting AC and/or DC power from an incident reader signal, and other specialized functions. The tag may also include an antenna array with sub-wavelength antenna elements for receiving and transmitting the signal. Once the tag is identified, the control system 210 interrogates the tag and the tag responds with identification information and/or healthcare-related information. According to one embodiment, a plurality of tags may be located within the medical device 202 with each tag assigned to monitor different health conditions and/or perform designated functions.

In some embodiments, an implanted medical device 202 may have the ability to communicate stored data, but only using an extremely low power transmission signal to conserve battery power. In such an embodiment, interrogator and/or reader 201 may utilize the tuning process described herein to focus an array of sub-wavelength antenna elements on the implanted medical device 202 in real-time—even as it moves around within the patient.

Figure 3:
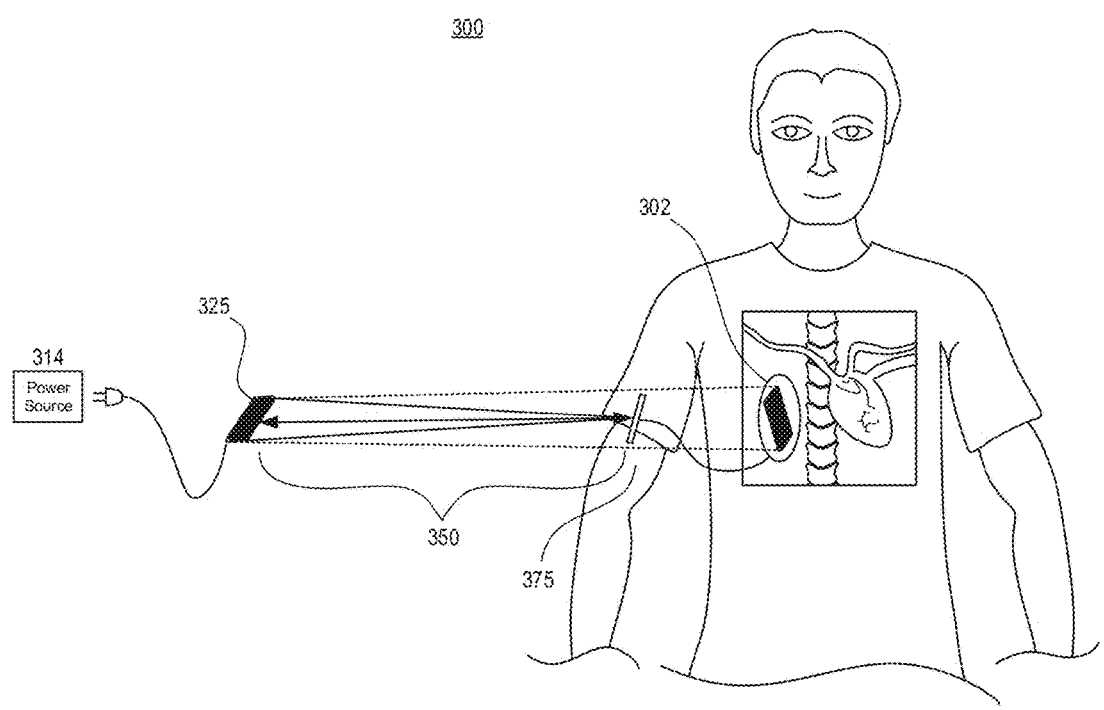
FIG. 3 is an illustration of a wireless power transfer system transferring power from a power source to a medical device, according to one embodiment.

FIG. 3 is another simplified illustration of a wireless power transfer system 300 transferring power from a power source 314 to a medical device 302, according to one embodiment. The wireless power transfer system 300 may include a metamaterial surface antenna transmitter 325 that can transmit a relatively narrow beam 350 to a metamaterial surface antenna receiver 375 associated with the medical device 302. The beam 350 may provide sufficient power to instantaneously power and/or charge a battery or capacitor within the medical device 302 implanted within a body. The location of the implanted medical device 302 may be provided to the wireless power transfer system 300 through a third device configured to track location based on real-time feedback from the implanted medical device 302. Alternatively, the location of the implanted medical device 302 may be detected by the transmitting metamaterial surface antenna transmitter 325 based on a received signal strength indication (RSSI) signal received from the implanted medical device 302 during power transmission. In such embodiments, the transmitting metamaterial surface antenna transmitter 325 may dynamically tune variable impedance elements to maximize the RSSI signal received from the implanted medical device 302.

In various embodiments, the wireless power transfer system 300 may utilize zones of exclusion to increase side-lobe suppression and/or otherwise not oversaturate certain zones in close proximity. For example, it may be desirous to limit the power density that contacts certain organs within a body.

FIG. 4 is a flow chart of one embodiment of a method 400 for radiation patterning by optimizing variable impedance values associated with an S-Matrix that includes at least one lumped port external to an antenna system. The method illustrated may be computer-implemented via software, hardware, firmware, and/or a processor or microprocessor. In other embodiments, the method may be implemented using an application specific integrated circuit, a field-programmable gate array, other hardware circuitry, integrated circuits, software, firmware, and/or a combination thereof. As illustrated, an S-Matrix may be determined that includes field amplitudes for each of a plurality of lumped ports, N, associated with an antenna device, at 410.

The N lumped ports may include a plurality of lumped antenna ports, $N_a$, wherein each lumped antenna port corresponds to an impedance value of a lumped impedance element in communication with at least one sub-wavelength antenna element of an antenna device, wherein the impedance value of each of the lumped impedance elements is variable based on one or more impedance control inputs, and at least one lumped external port, $N_e$, located physically external to the antenna device. In various embodiments, the S-Matrix may be expressible in terms of an impedance matrix, Z-Matrix, with impedance values, $z_n$, of each of the plurality of lumped ports, N.

Once the S-Matrix has been determined, a target radiation pattern of the antenna device may be defined in terms of target field amplitudes in the S-Matrix for the at least one lumped external port, $N_e$, at 420. An optimized port impedance vector, $\{z_n\}$, of impedance values for each of the lumped antenna ports, $N_a$, may then be determined, at 430, that results in an S-Matrix element for the at least one lumped external port, $N_e$, that approximates the target field amplitude for an operating frequency or operating frequency range.

Figure 5:
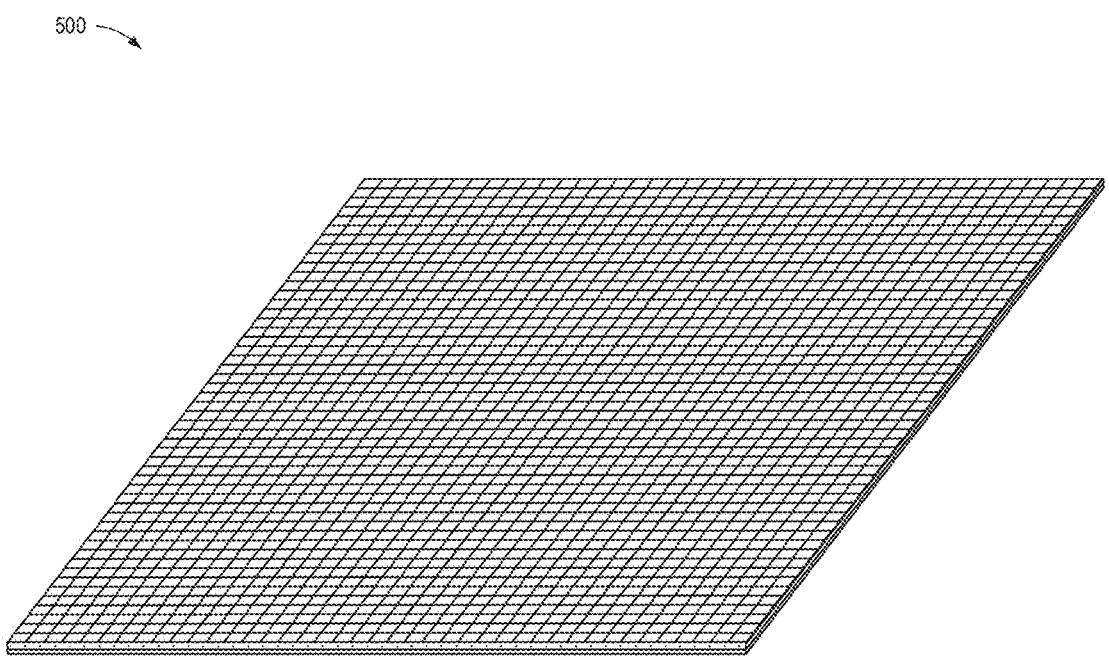
FIG. 5 illustrates an antenna system comprising an array of sub-wavelength antenna elements, according to one simplified embodiment.

FIG. 5 illustrates an antenna system comprising an array of sub-wavelength antenna elements 500, according to one simplified embodiment. The sub-wavelength antenna elements 500 may be associated with a plurality of variable or tunable impedance elements.

The array of sub-wavelength antenna elements 500 may form a two-dimensional array as illustrated, or may form a three-dimensional array. The lumped impedance elements may form any of a rectangular two-dimensional array, a square two-dimensional array, a triangular two-dimensional array, and a hexagonal two-dimensional array. The lumped impedance elements may alternatively be configured as a concentric-circular array with elements aligned along concentric circles. In other embodiments, the lumped impedance elements form a concentric-circular array with elements aligned along radial lines from a common center. Other array shapes are possible, including arbitrarily or even randomly arranged lumped impedance elements.

Figure 6:
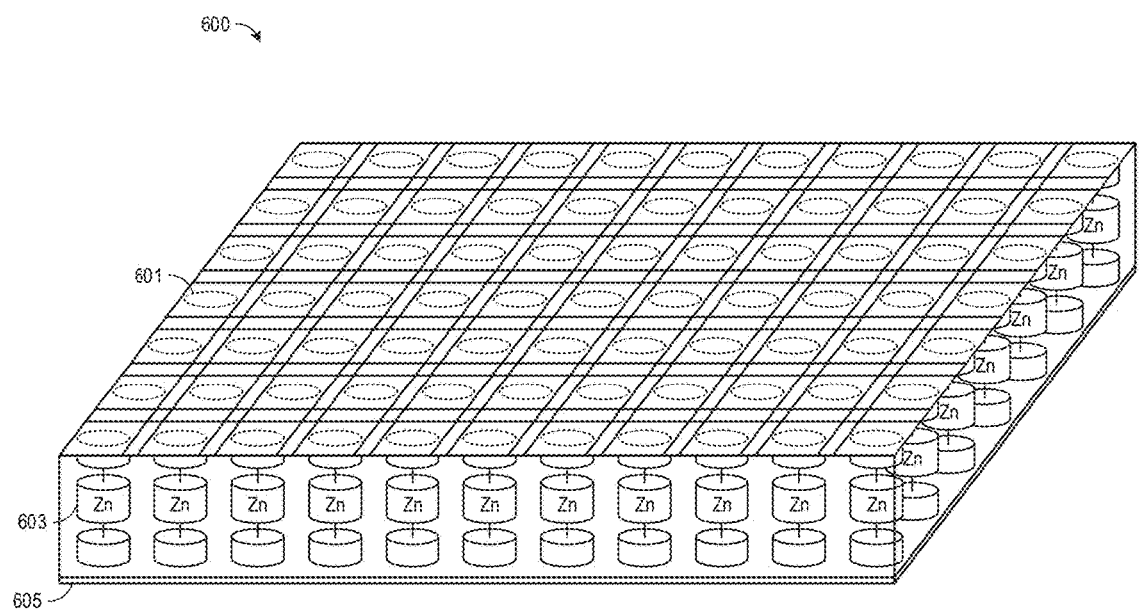
FIG. 6 illustrates a close-up view of a section of an array of sub-wavelength antenna elements with associated variable impedance elements, according to one simplified embodiment.

FIG. 6 illustrates a conceptual model of an antenna system 600 showing a section of an array of sub-wavelength antenna elements 601 with associated variable lumped impedance elements, $z_n$, 603 according to a simplified embodiment. As previously described, the sub-wavelength antenna elements 601 may have inter-element spacings that are substantially less than a free-space wavelength corresponding to an operating frequency or frequency range of the antenna system 600. For example, the inter-element spacings may be less than one-half or one-quarter of the free-space operating wavelength.

As shown, each of the sub-wavelength antenna elements 601 is associated with at least one lumped impedance element 603. A common TL 605 may be coupled to the sub-wavelength antenna elements via the lumped impedance elements and may be modeled as another lumped impedance element or may be incorporated based on the effects of the TL 605 or other common waveguide on each of the lumped impedance elements 603. Each lumped impedance element 603 may have a variable impedance value that is set during manufacture or that can be dynamically tuned via one or more control inputs. The 1:1 ratio of lumped impedance elements 603 and sub-wavelength antenna elements 603 is merely exemplary and other ratios are possible.

In some embodiments, the sub-wavelength antenna elements may be divided into two or more groups that are separated from one another by no more than half of an operating wavelength. Each group of sub-wavelength antenna elements may be spatially separated from each other group of sub-wavelength antenna elements by at least a distance exceeding that of half of an operating wavelength.

The separation of each group from each other may be greater than a Fraunhofer (far-field) distance associated with an aperture diameter of a largest of the at least two groups. In other embodiments, the separation from each group may be less than a Fraunhofer distance. In other embodiments, the separation of each group may be shorter than a diameter of a largest of the at least two groups or alternatively the separation distance may be associated with the free-space operation wavelength (e.g., longer, the same as, or shorter). In many embodiments, the individual elements and/or groups of elements may be in the reactive near-field of one another. The groups of sub-wavelength elements may be part of a receiver antenna element physically coupled to a receiver device.

The array of antenna elements 600 need not be planar as illustrated in FIG. 6, nor must it be ridged. Flexible and curved arrangements are possible. In some embodiments, two groups of sub-wavelength antenna elements are coplanar with one another and at least one other group is non-co-planar with the first two, co-planar groups.

Figure 7:
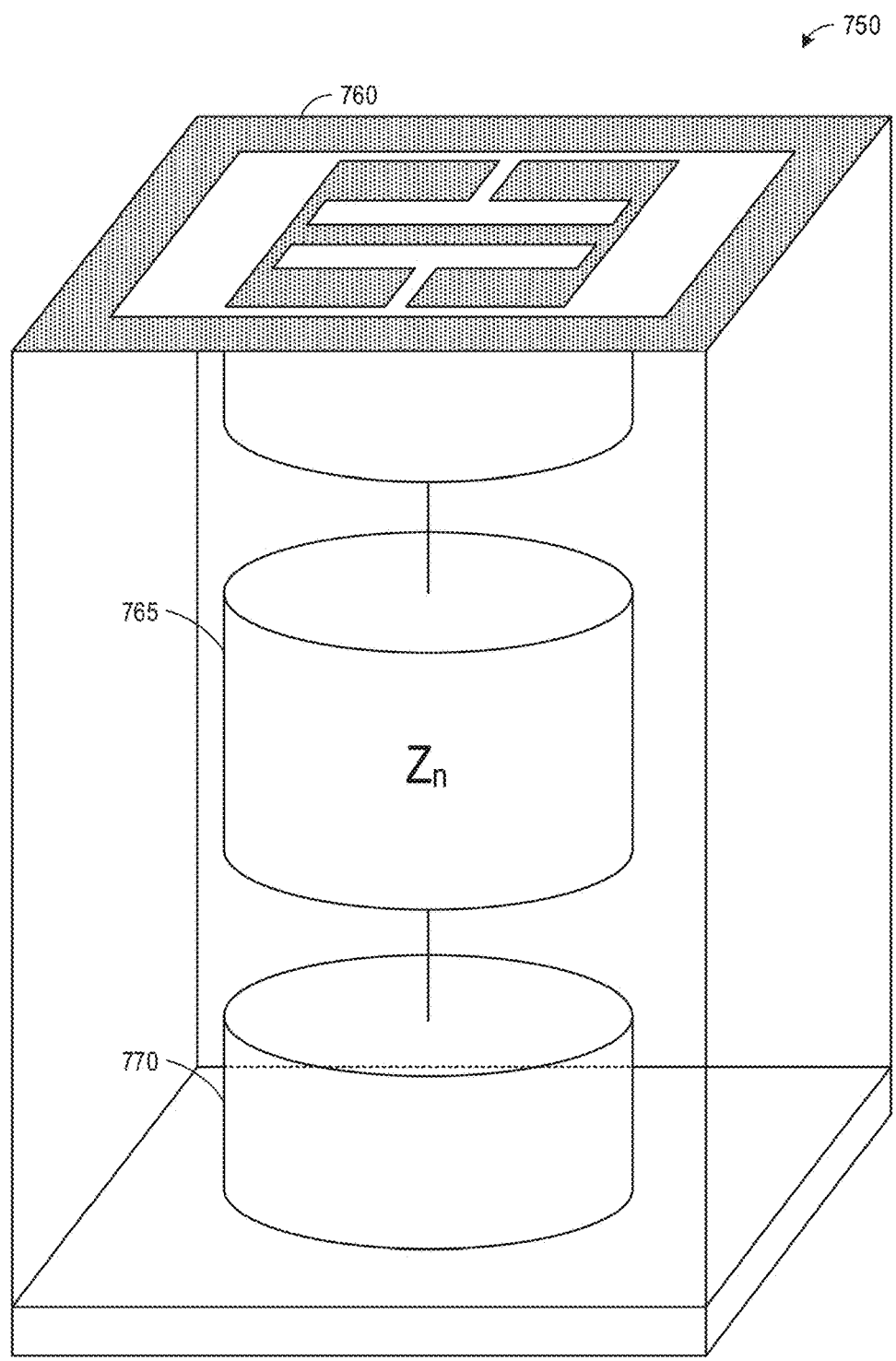
FIG. 7 illustrates a view of a conceptual model of a single sub-wavelength antenna element with an associated impedance element, according to one simplified embodiment.

FIG. 7 illustrates a close-up view 750 of a model of a single sub-wavelength antenna element 760 with an associated lumped impedance element, $z_n$, 765, and an impedance control input 770 that can be used to control or vary the impedance of the lumped impedance element, $z_n$, 765, according to one simplified embodiment.

Sub-wavelength antenna element 760 may be arranged in an array and may be configured for submersion in a fluid, such as fresh water, salt water, brackish water, or a particular gaseous environment.

Figure 8A:
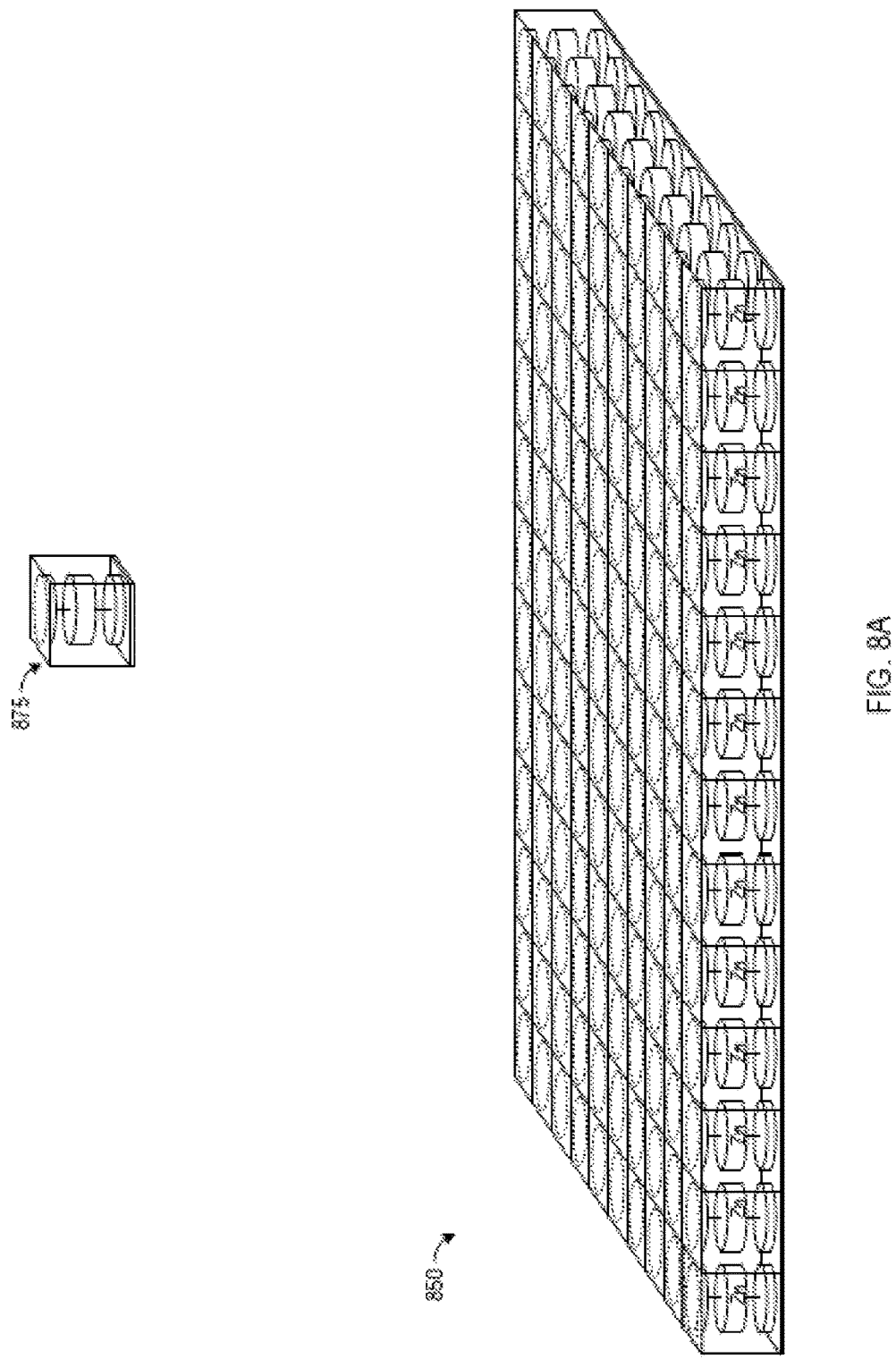
FIG. 8A illustrates an array of sub-wavelength antenna elements and associated variable impedance elements modeled as lumped ports, $N_a$, in an S-Matrix with a single external port, $N_e$, located physically external to the antenna system, according to one simplified embodiment.

FIG. 8A illustrates an array of sub-wavelength antenna elements 850 and associated variable lumped impedance elements with variable impedances $z_n$, modeled as lumped ports, $N_a$, in an S-Matrix with a single external port, $N_e$, 875 that is located physically external to the antenna system 850, according to one simplified embodiment.

In various embodiments, the modeled lumped external port, $N_e$, 875 may be associated with a variable impedance element, as illustrated. In some embodiments, the lumped external port, $N_e$, 875 is modeled as an external port with an infinitesimal volume located at a particular radius-vector relative to the antenna device. The lumped external port, $N_e$, 875 may be in the far-field of the antenna device, the radiative near-field of the antenna device, or the reactive near-field of the antenna device.

In some embodiments, the lumped external port, $N_e$, 875 may comprise a virtual port, an external region of space assumed to be a void, a region of space assumed to be filled with a dielectric material, and/or a location in space assumed to be filled with a conductive, radiative, reactive, and/or reflective material. In at least some embodiments, the lumped external port, $N_e$, 875 comprises or corresponds to the location of a receiving antenna or portion thereof.

FIG. 8B illustrates a radiation pattern 880 formed to maximize a field amplitude of an S-Matrix element associated with an external port, $N_e$, 875 located physically external to the antenna system by adjusting the impedance values, $z_n$, associated with each of the lumped ports, $N_a$, defined by the sub-wavelength antenna elements and associated lumped impedance elements in the antenna system 850, according to one embodiment. External port, $N_e$, 875, may be associated with a medical device. Thus, antenna system 850 may be used to form a radiation patter 880 to provide power to, communicate with, and/or control a device associated with external port, $N_e$, 875. The control of the medical device may comprise digital control signals interpreted by a processor or circuitry within the medical device. In other embodiments, the control signals may be more simplistic. For example, the medical device associated with external port, $N_e$, 875 may respond predictably to specific radiation patterns, frequencies, modulations, and/or other characteristics.

As a very simple example, a medical device may have two power receiving ports, each of which is modeled as a unique external port, $N_e$, 875. Providing power to one of these power receiving ports may cause the medical device to move in a first direction or rotate in first direction. Providing power to the other receiving port may cause the medical device to move in a second, different direction or rotate in a second, different direction. A plurality of ports, each of which can be modeled as a uniquely addressable external port could be used to control a wide variety of functions available to medical device.

FIG. 8C illustrates a radiation pattern 880 formed to maximize a field amplitude of S-Matrix elements associated with two external ports, $N_e$, 875 and 876 located physically external to the antenna system and by minimizing the field amplitude of three other external ports, $N_e$, 873, 874, and 877, according to one embodiment. In the illustrated embodiment, each of the external ports 873, 874, 875, 876, and 877 may be associated with a particular sub-system of a medical device.

While the possibilities are nearly endless, the example below is one possible arrangement. External port 873 may be associated with a data transmission function. External port 874 may be associated with a measurement or monitoring function. External ports 875 and 876 may be associated with a power or charging function of the medical device. Finally, external port 877 may be associated with a rotational and/or movement sub-system of a medical device. By selectively modifying the radiation patter 880, a control system using antenna 850 can recharge and/or power a medical device by forming a radiation patter highly focused on external ports 875 and 876.

After it is charged (or while continuing to provide power), the control system may focus radiation on external port 877 to rotate a medical device within, for example, an artery or cavity of a patient. Once correctly positioned, the control system may focus radiation on external port 874 to cause the medical device to capture data (e.g., (imaging data, monitoring data, or a sample). By subsequently focusing radiation on external port 873, the medical device may transmit the data to a receiver (potentially the antenna 850 itself). As clearly described herein, "external ports" are not necessarily actual "ports" on the medical device in a traditional sense. Rather, the external ports are modeled locations in three-dimensional space as described in the equations herein.

As previously described, multiple beams can be formed simultaneously or in switch-mode by considering M output ports (e.g., the three different external ports, $N_e$, 975) located in different directions and potentially very distant from one another. The size of the system matrices to be optimized may then correspond to N=Na+M+1, but again, this does not change the general course of the algorithm nor does this increase the complexity exponentially.

As previously discussed, approximate nulls of the field can be formed, either in the far-field or near-field, by considering a minimization problem for the rational functions described in detail above. To attain a specific target radiation pattern, a required level of sidelobe suppression can be attained by maximizing the function $F=|S_{1,N}|^2-\alpha|S_{1,N+1}|^2$, where the $N^{th}$ port measures the field intensity in one direction, the (N+1) port measures field intensity in a specified sidelobe direction, where $\alpha$ is a selectable weight coefficient reflecting the degree to which sidelobe suppression should be achieved.

Figure 9:
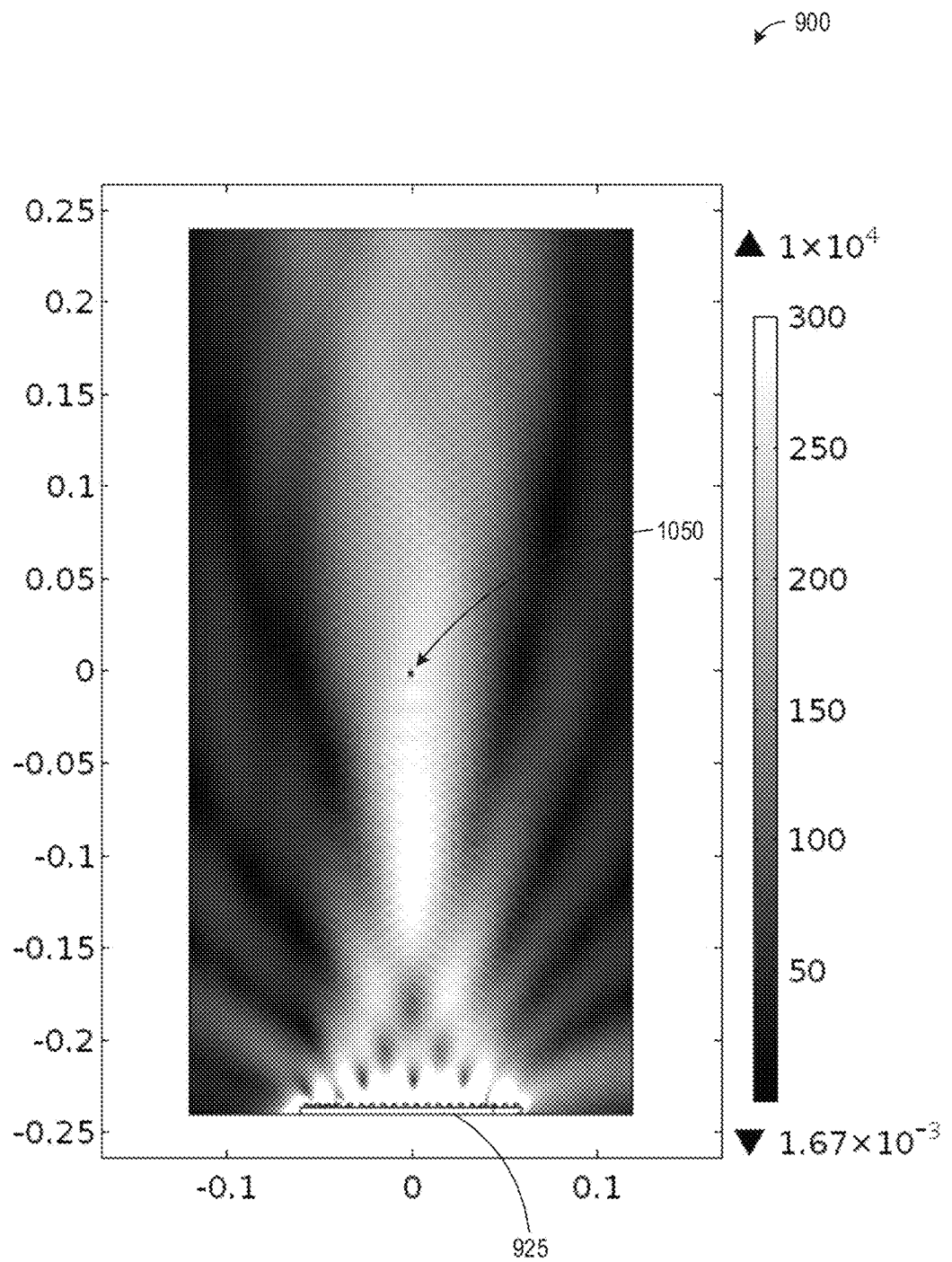
FIG. 9 illustrates an edge-fed metamaterial surface antenna for wireless power transfer transmitting a convergent beam to an electrically small antenna, according to one embodiment.

FIG. 9 illustrates an edge-fed metamaterial surface antenna 925 for wireless power transfer transmitting a convergent beam 900 to an electrically small antenna 950, according to one embodiment. Gaussian beamforming can generally be understood as a generalization of the holographic beamforming techniques described above. Accordingly, many of the same features, variations, approaches, equations, and/or calculations may be applicable to Gaussian beamforming.

The illustrated edge-fed metamaterial surface antenna 925 may, as an example, be four wavelengths wide. The width of the beam near the electrically small antenna 950 may be approximately two wavelengths wide. The holographic Gaussian beamforming techniques described herein allow for beams with a minimum waist size that is substantially smaller than the transmitting aperture diameter. Such convergent beams may only be possible within the Fraunhofer distance of the transmitter, where the Fraunhofer distance, $D_{Fr}$ is defined as: $D_{Fr}=2\ D^2/\lambda$, where D represents the aperture diameter of the transmitter and $\lambda$ represents the wavelength. The region within the Fraunhofer distance of the transmitter may be referred to as the radiative near-field (RaNF).

Figure 10:
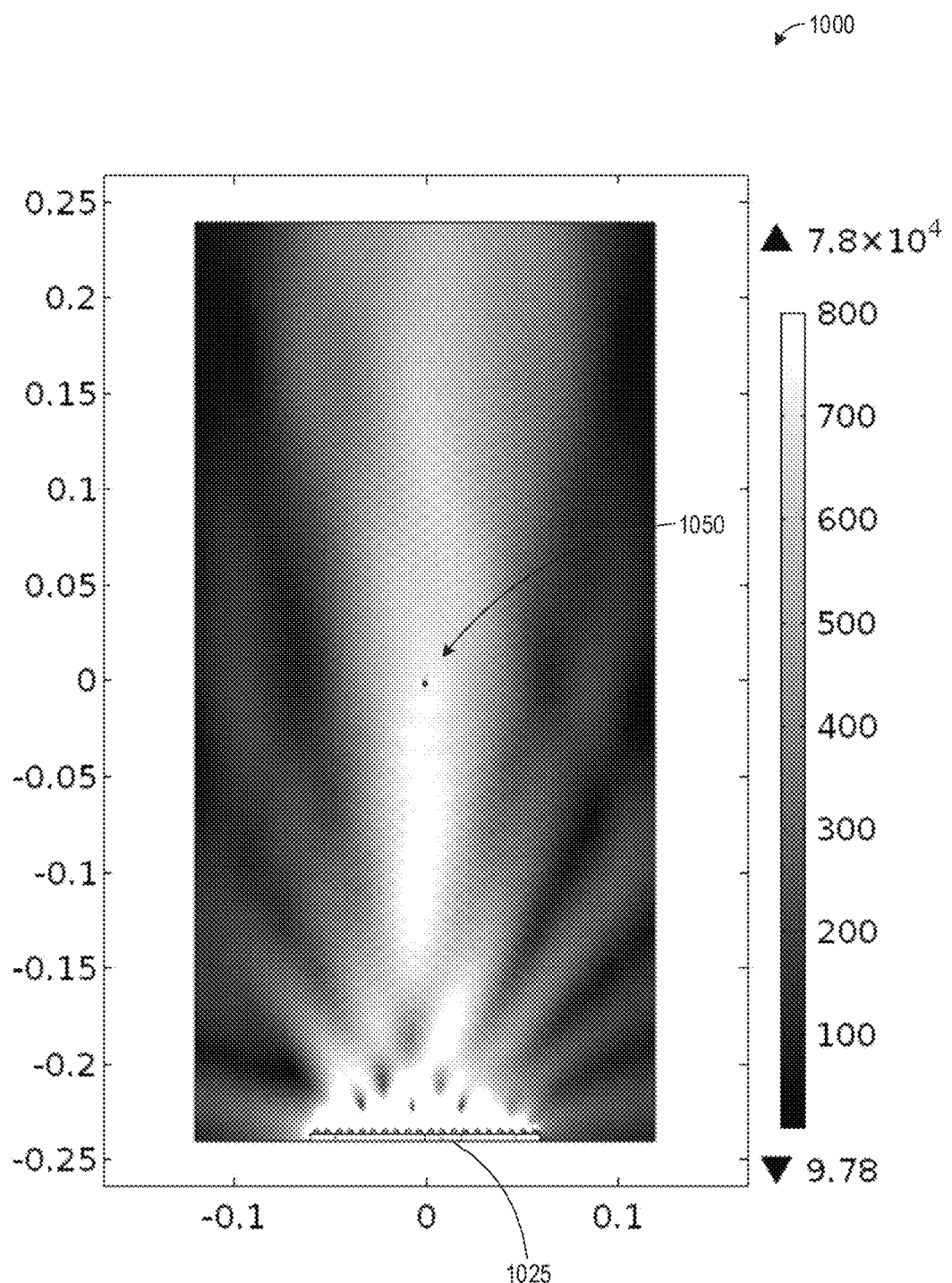
FIG. 10 illustrates a center-fed metamaterial surface antenna for wireless power transfer transmitting a convergent beam to an electrically small antenna, according to another embodiment.

FIG. 10 illustrates a center-fed metamaterial surface antenna 1025 for wireless power transfer transmitting a convergent beam 1000 to an electrically small antenna 1050, according to another embodiment. The center-fed metamaterial surface antenna 1025 illustrates a narrow-waist beam transmitted from a transmitter for wireless power transfer. For both center- and edge-fed metamaterial surface antennas (e.g., 925 and 1025), the relationship between minimum waist size, transmitter size, and transmission distance may be described as: $D_{max}=D_{Tx}D_{Rx}/\lambda$, where $D_{max}$ is the maximum transfer distance at which a receiver with an aperture diameter, $D_{Rx}$, that corresponds to the minimum waist diameter can be used with a receiver with an aperture diameter, $D_{Tx}$, can be used for a given wavelength, $\lambda$. Thus for distances up to $D_{max}$, power transmission can be attained with 50-90% efficiency.

As an example, for $\lambda$=3 mm (100 GHz) and a receiver with an aperture diameter of 30 cm, the maximum transfer distance, $D_{max}$, would be 100 multiplied by the transmitter aperture diameter, $D_{Tx}$. Thus, a transmitter with an aperture diameter of one meter could efficiently transmit up to 100 meters.

Figure 11:
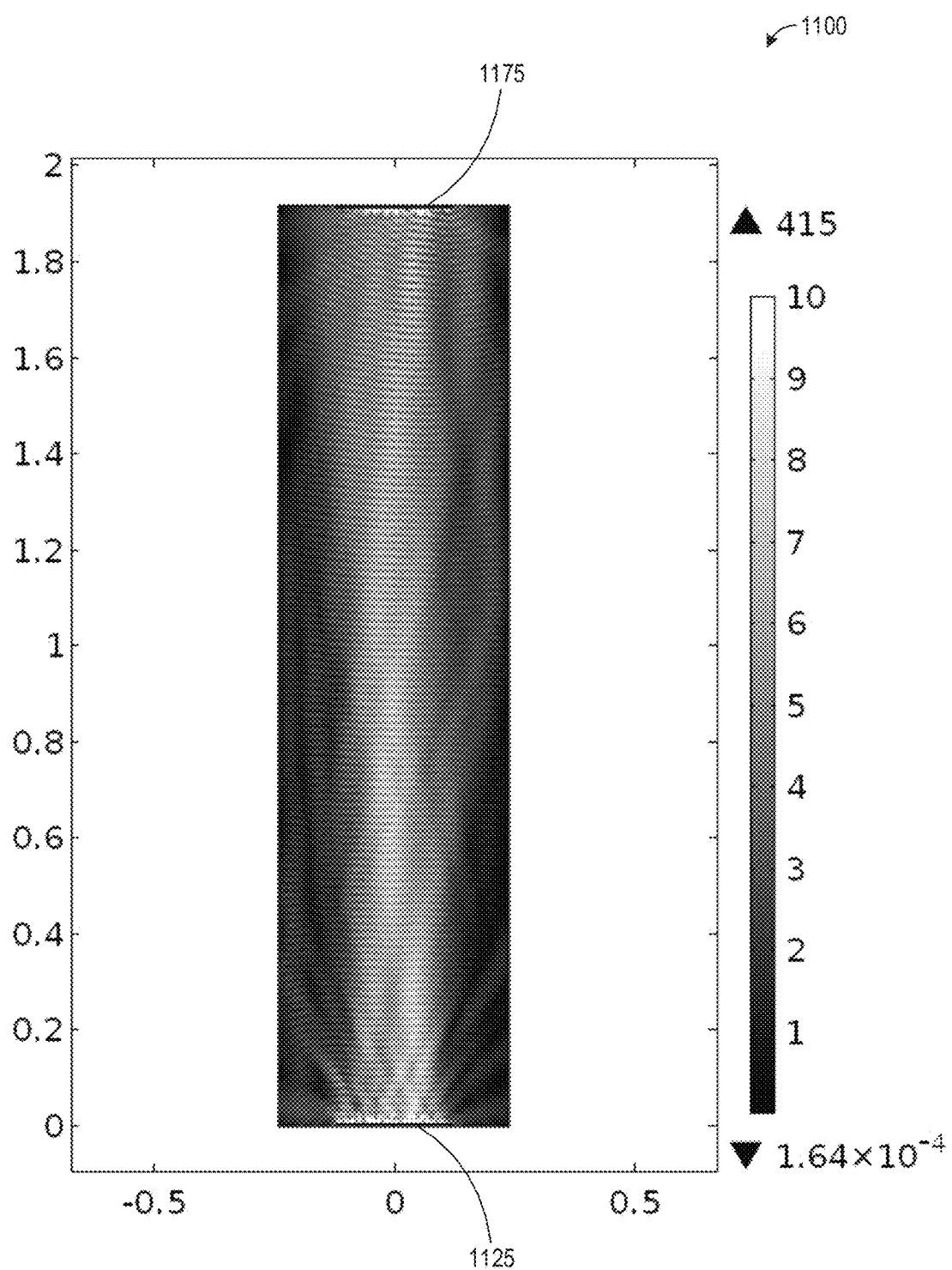
FIG. 11 illustrates a metamaterial surface antenna wireless power transmission system with utilizing two center-fed metamaterial surface antennas (one as a transmitter and one as a receiver) with a transfer efficiency approximating 100% at one-half of the Fraunhofer distance.

FIG. 11 illustrates a metamaterial surface antenna wireless power transmission system with utilizing two center-fed metamaterial surface antennas (one as a transmitter 1125 and one as a receiver 1175) with a transfer efficiency approximating 100% at one-half of the Fraunhofer distance. At one half of the Fraunhofer distance, the beam waist is approximately equal to the transmitter 1125 diameter and the receiver 1175 diameter of approximately the same size can be used to intercept nearly 100% of the transmitted power. As the transfer distance between the transmitter 1125 and the receiver 1175 increases to the Fraunhofer distance, the minimum achievable beam 1100 waist approaches the far-field estimate, which is roughly $D^2/\lambda$. Thus, for a fixed size receiver, efficiency decreases with the inverse square of the distance as is understood with far-field transmission.

Figure 12:
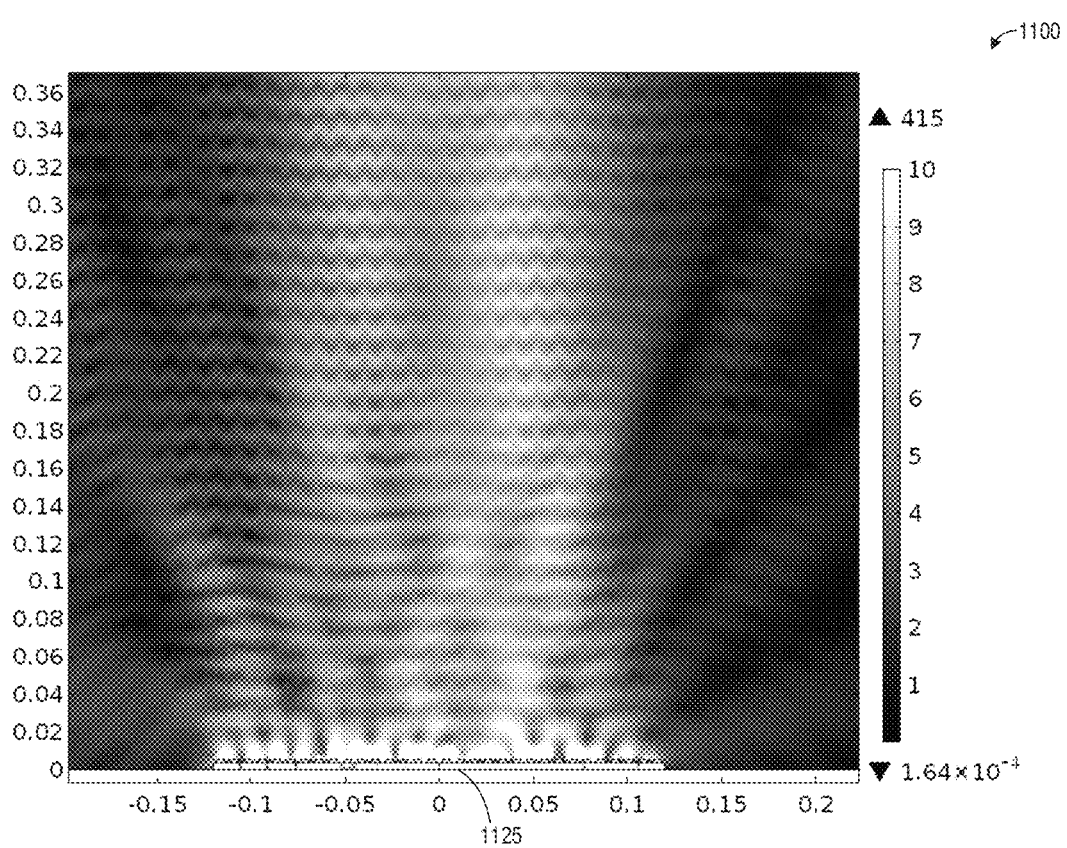
FIG. 12 illustrates a zoomed in view of the transmitter of the metamaterial surface antenna wireless power transmission system.

FIG. 12 illustrates a zoomed in view of the transmitter 1125 of the metamaterial surface antenna wireless power transmission system 1100. The illustrated embodiment is approximately eight free-space wavelengths, $\lambda$, in diameter. The illustrated embodiment is simulated with 32 unit cells, with one tunable lumped element per cell, making the array pitch $\lambda/4$. As the Fraunhofer distance may be simply defined as $2*D^2/\lambda$, one half of the Fraunhofer distance can be expressed as $D^2/\lambda$. As the diameter of the transmitter 1125 is $8*\lambda$, the transfer distance amounts to $(8*\lambda)^2/\lambda$, which is equal to $64\lambda$. Described in terms of antenna aperture, the transfer distance equals eight antenna diameters.

Generally, diffraction limits the minimum possible beam waist to about half-wavelength. To achieve Gaussian beams with the tightest possible waists, the spatial Fourier spectrum of the radiated mode must contain transverse wave-numbers close to maximum free space number, and the spectrum must be accurately sampled.

Figure 13A:
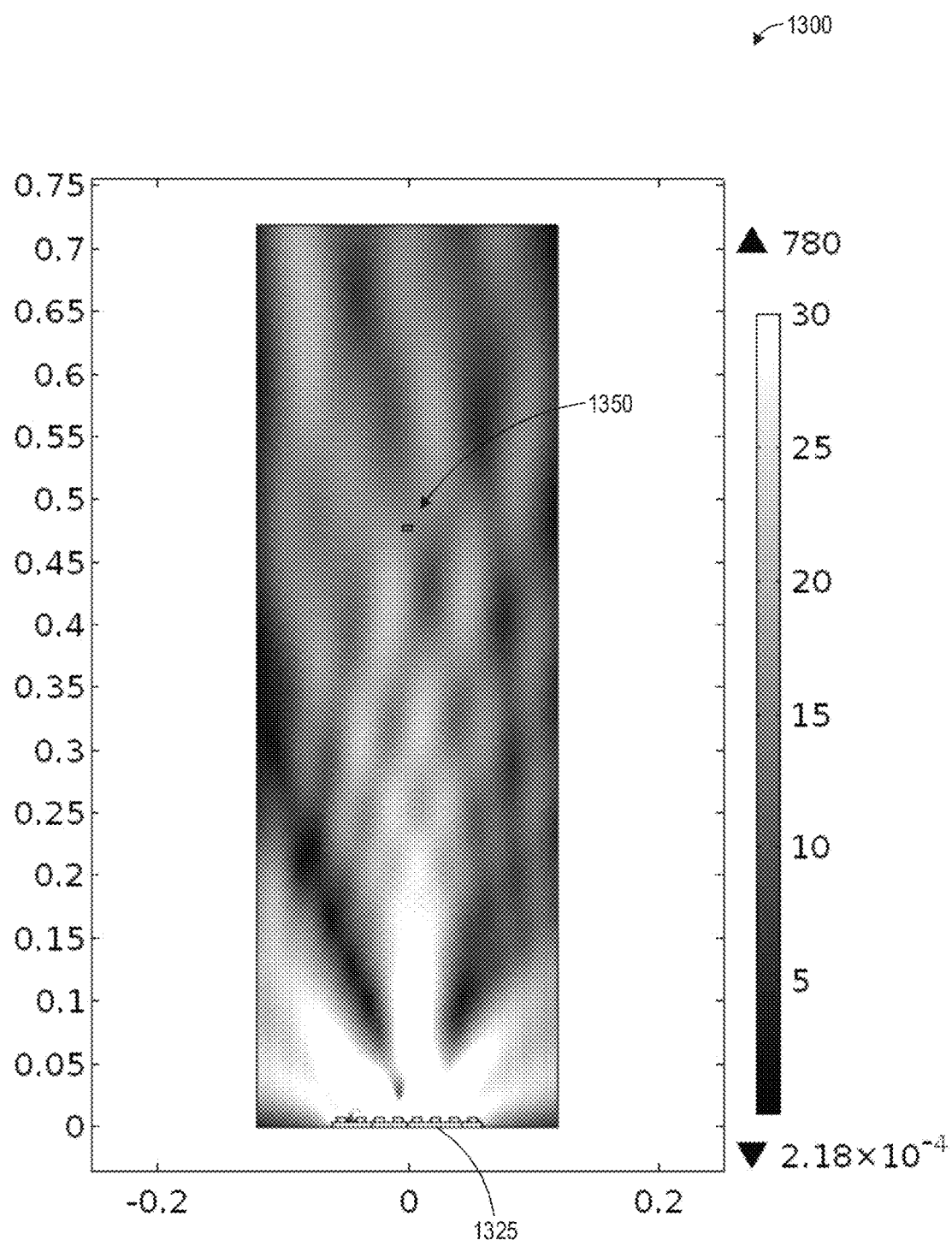
FIG. 13A illustrates a relatively inefficient metamaterial surface antenna with two sub-wavelength antenna elements per wavelength attaining a resolution similar to a conventional phases array.
Figure 13B:
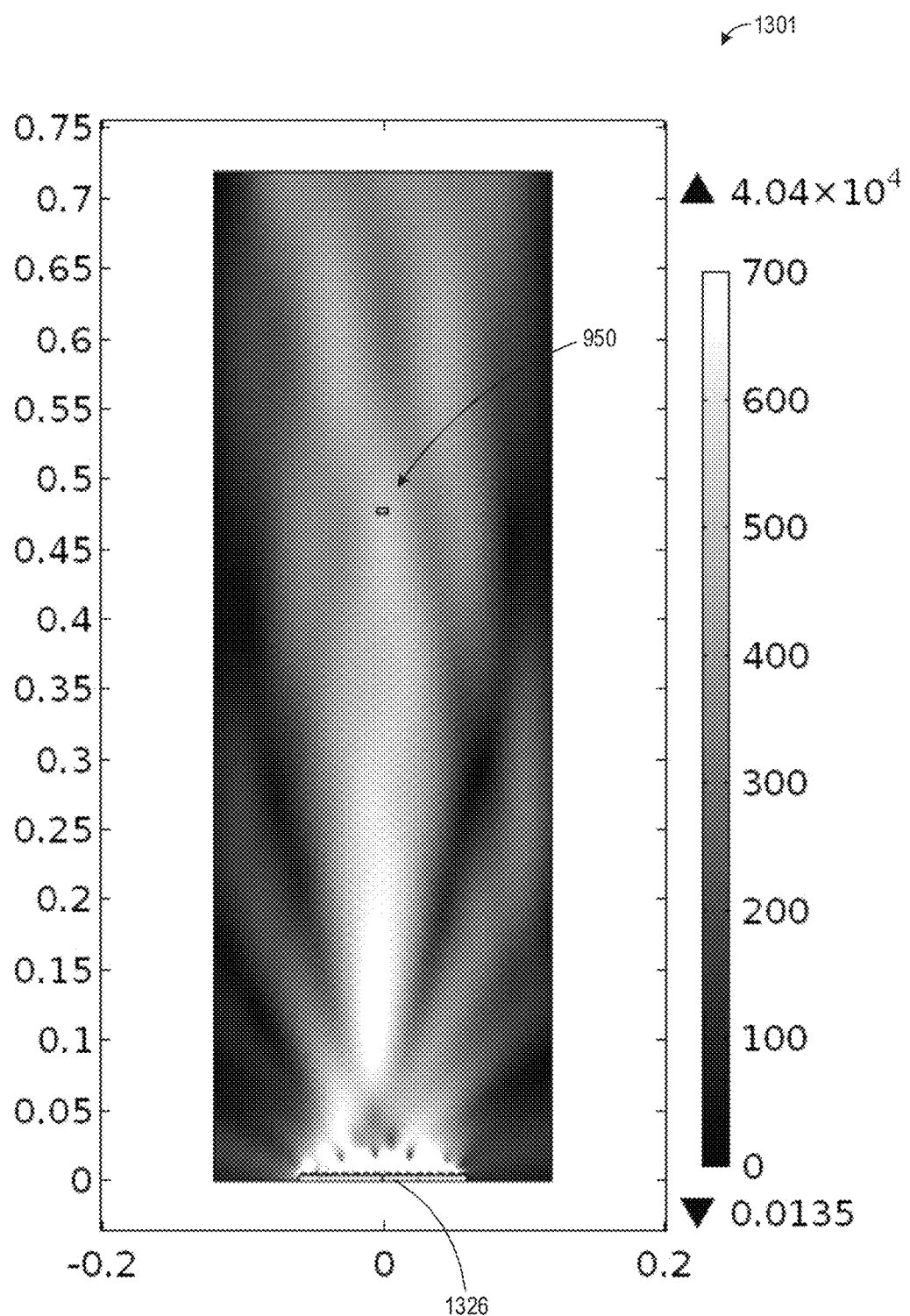
FIG. 13B illustrates a more efficient metamaterial surface antenna with four sub-wavelength antenna elements per wavelength attaining an improved resolution for a more efficient wireless power transfer.
Figure 13C:
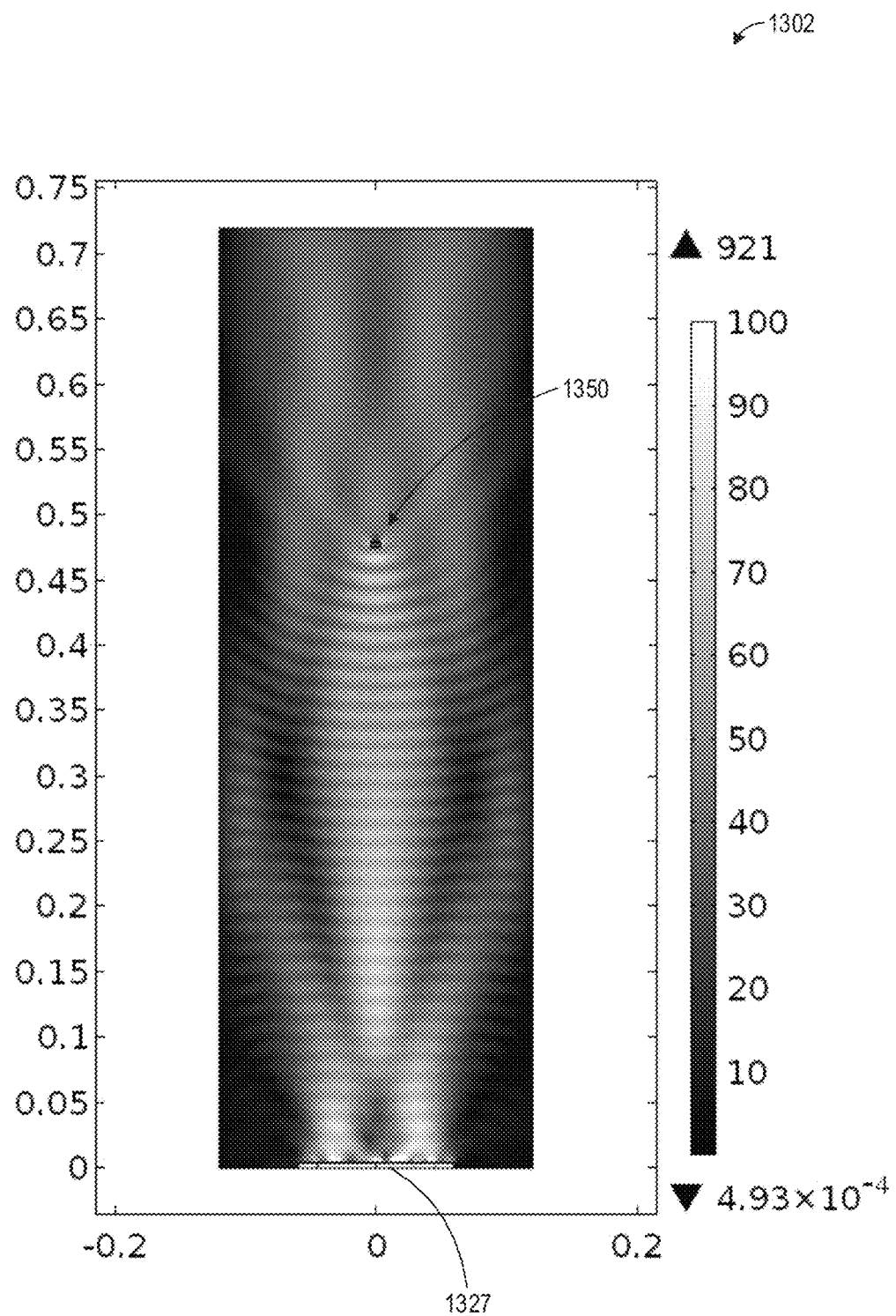
FIG. 13C illustrates an even more efficient metamaterial surface antenna with eight sub-wavelength antenna elements per wavelength attaining even greater resolution for improved wireless power transfer.

In FIGS. 13A-13C, the number of radiating elements of the metamaterial surface transmitter is shown with two, four, and eight radiating elements. As illustrated in FIG. 13A, a transmitter 1325 with only two elements creates a relatively inefficient metamaterial surface antenna that is only able to attain a resolution similar to that of a conventional phases array. The waist size of the transmitted beam 1300 at the receiver 1350 is relatively wide.

FIG. 13B illustrates a more efficient metamaterial surface antenna 1326 with four sub-wavelength antenna elements per wavelength attaining an improved resolution 1301 for a more efficient wireless power transfer to the receiver 1350.

FIG. 13C illustrates an even more efficient metamaterial surface antenna 1327 with eight sub-wavelength antenna elements per wavelength attaining even greater resolution 1302 for improved wireless power transfer to the receiver 1350.

Figure 14A:
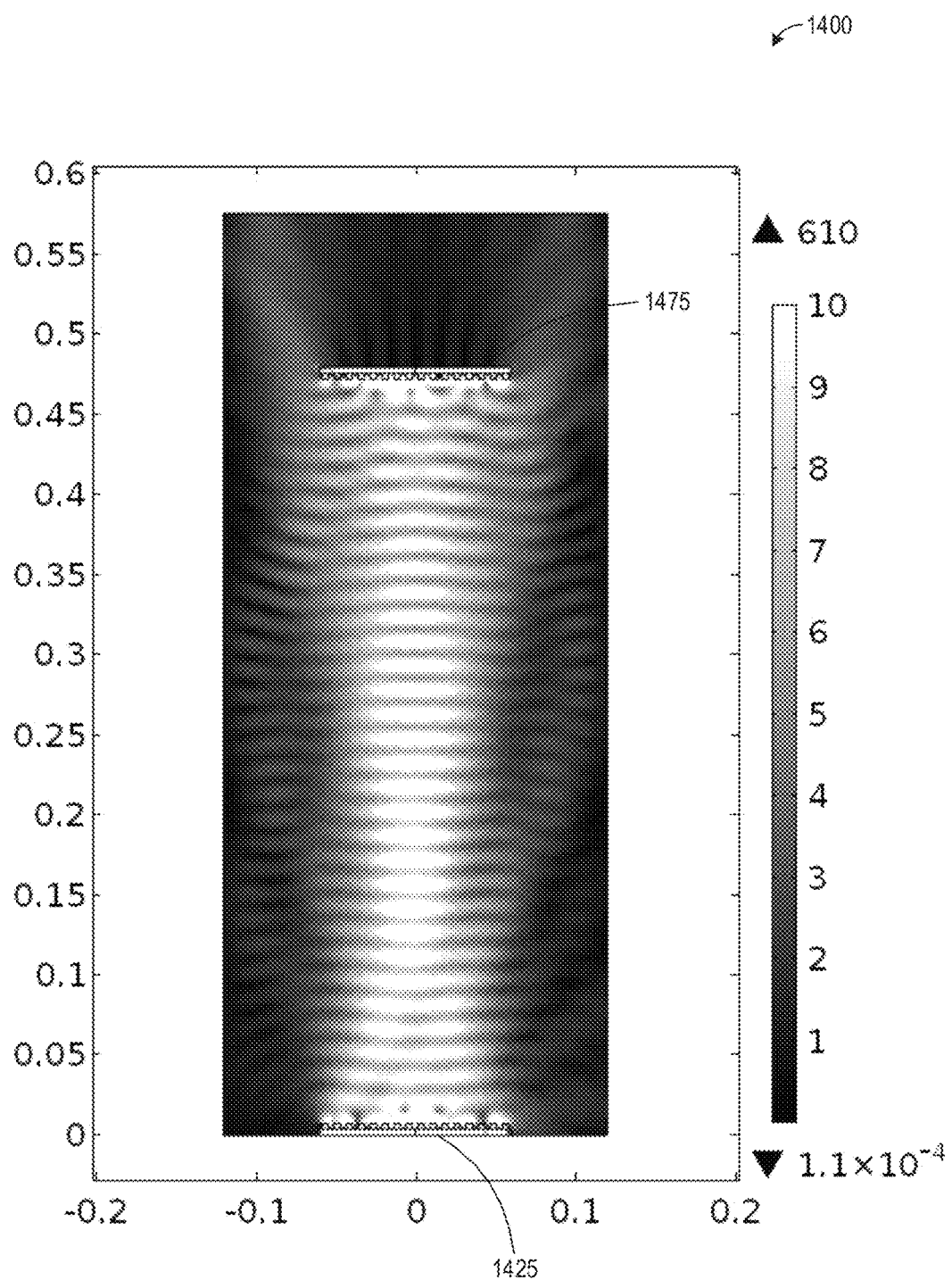
FIG. 14A illustrates two relatively low-density metamaterial surface antennas used as a transmitter and a receiver in a wireless power transmission system.

FIG. 14A illustrates two relatively low-density metamaterial surface antennas 1425 and 1475. A beam 1400 transmitted from the transmitter 1425 to the receiver 1475 of the wireless power transmission system is efficiently collected. In the illustrated embodiment, both the transmitter 1425 and the receiver 1475 are center-fed and the transfer occurs within the Fraunhofer distance.

Figure 14B:
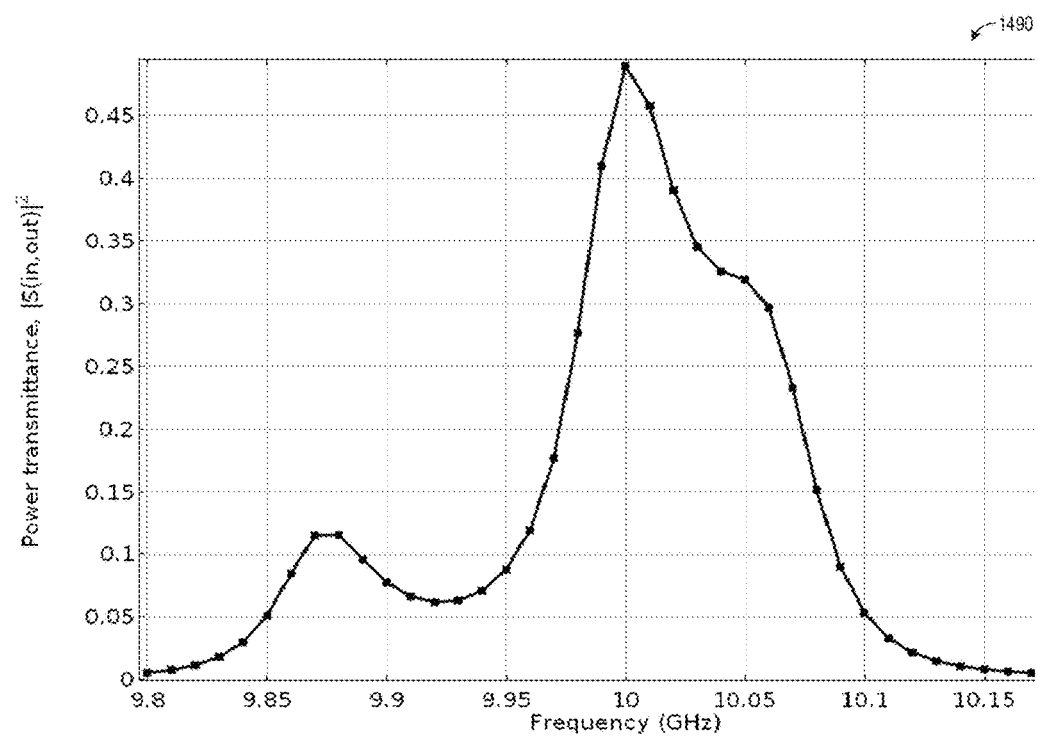
FIG. 14B illustrates a graph of power transmittance for a range of frequencies using the relatively low-density metamaterial surface antenna wireless power transmission system, according to one embodiment.

FIG. 14B illustrates a graph 1490 of power transmittance for a range of frequencies using the relatively low-density metamaterial surface antenna wireless power transmission system, according to one embodiment.

Figure 15A:
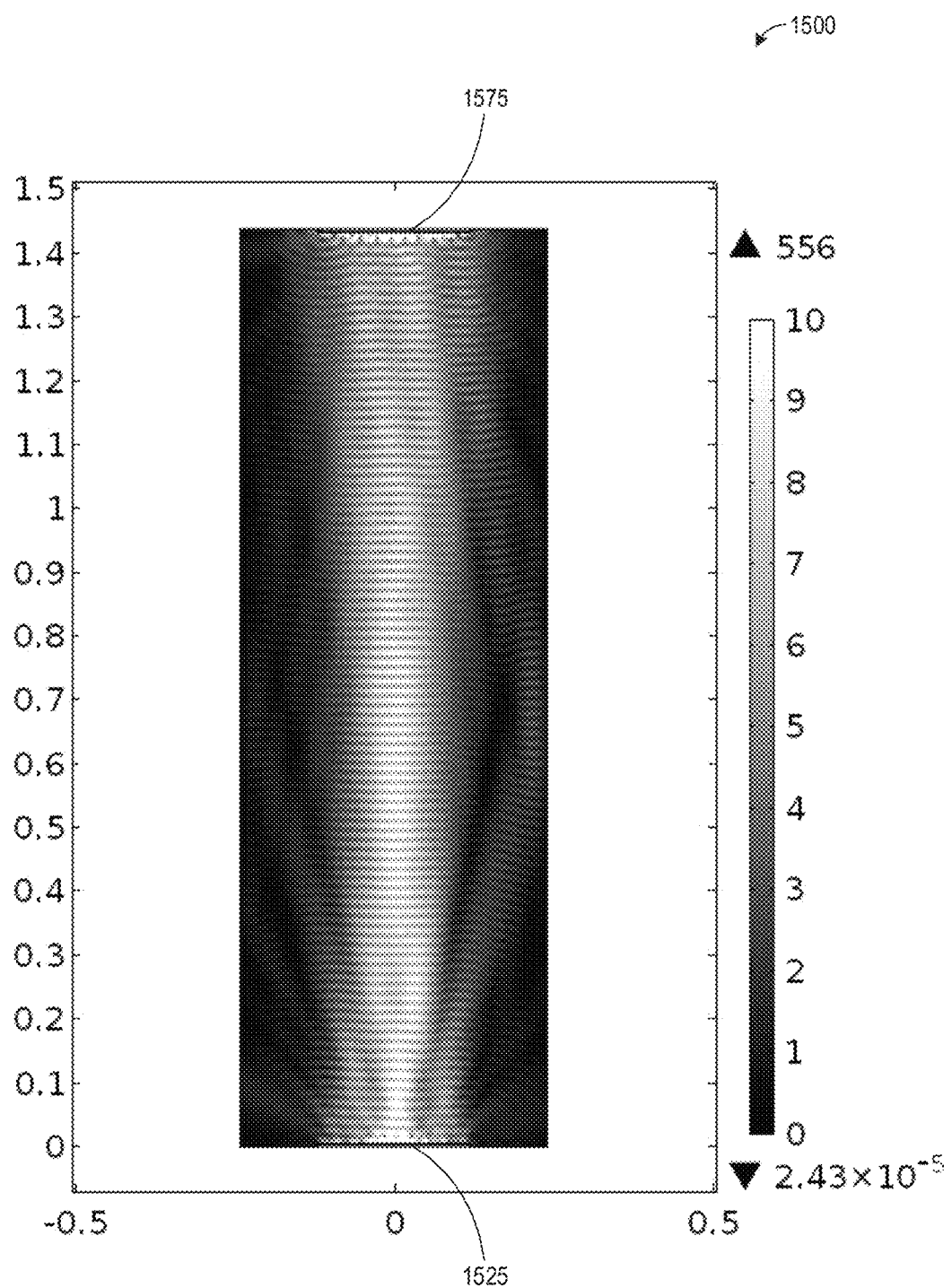
FIG. 15A illustrates two relatively high-density metamaterial surface antennas being used as transmitter and receiver in a wireless power transmission system.

FIG. 15A illustrates two relatively high-density metamaterial surface antennas 1525 and 1575 being used as transmitter 1525 and receiver 1575 in a wireless power transmission system. The wireless power transfer via the illustrated beam 1500 occurs within the Fraunhofer distance.

Figure 15B:
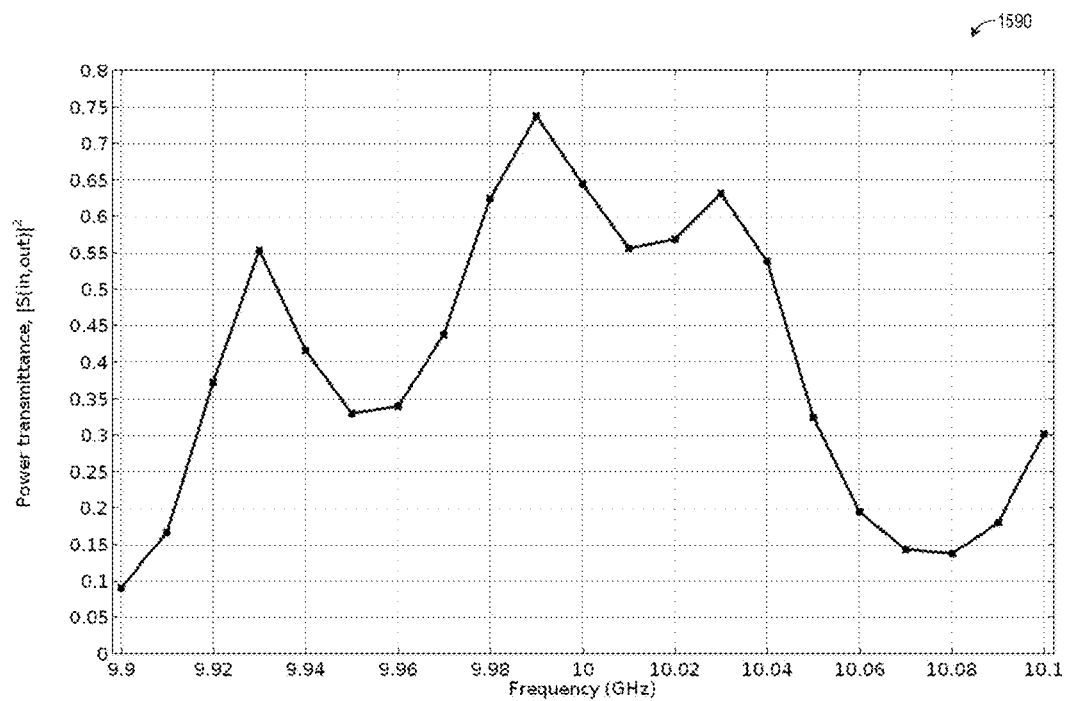
FIG. 15B illustrates a graph of improved power transmittance for a range of frequencies using the relatively high-density metamaterial surface antenna wireless power transmission system, according to another embodiment.

As shown in the graph 1590 of FIG. 15B, an improved power transmittance is possible for a range of frequencies using relatively high-density metamaterial surface antennas, according to various embodiments.

Figure 16:
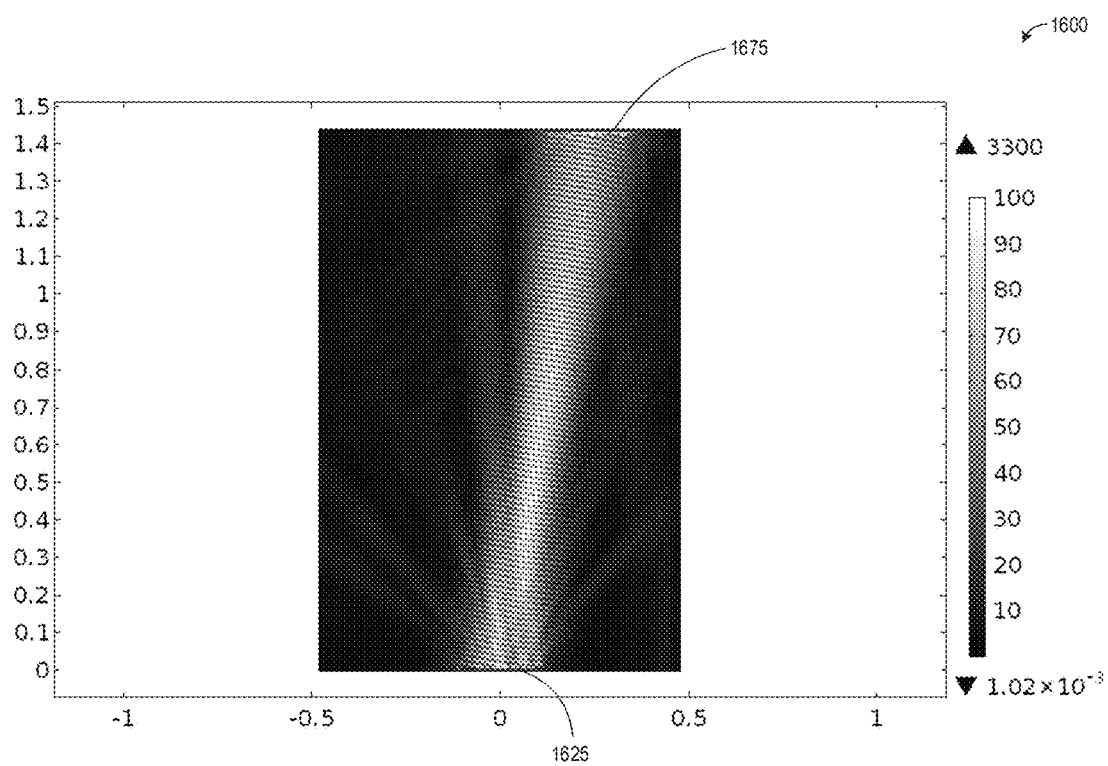
FIG. 16 illustrates a steerable metamaterial surface antenna wireless power transmission system, according to one embodiment.

FIG. 16 illustrates a steerable metamaterial surface antenna wireless power transmission system, according to one embodiment. As illustrated, the beam 1600 can be transmitted at an angle relative to the normal of the transmitter 1625 and the receiver 1675. The ability to dynamically modify the angle at which the beam 1600 is transmitted to the receiver 1675, without requiring the angle of either the transmitter 1625 or the receiver 1675 to move, allows for efficient wireless power transfer to moving objects and devices.

Figure 17A:
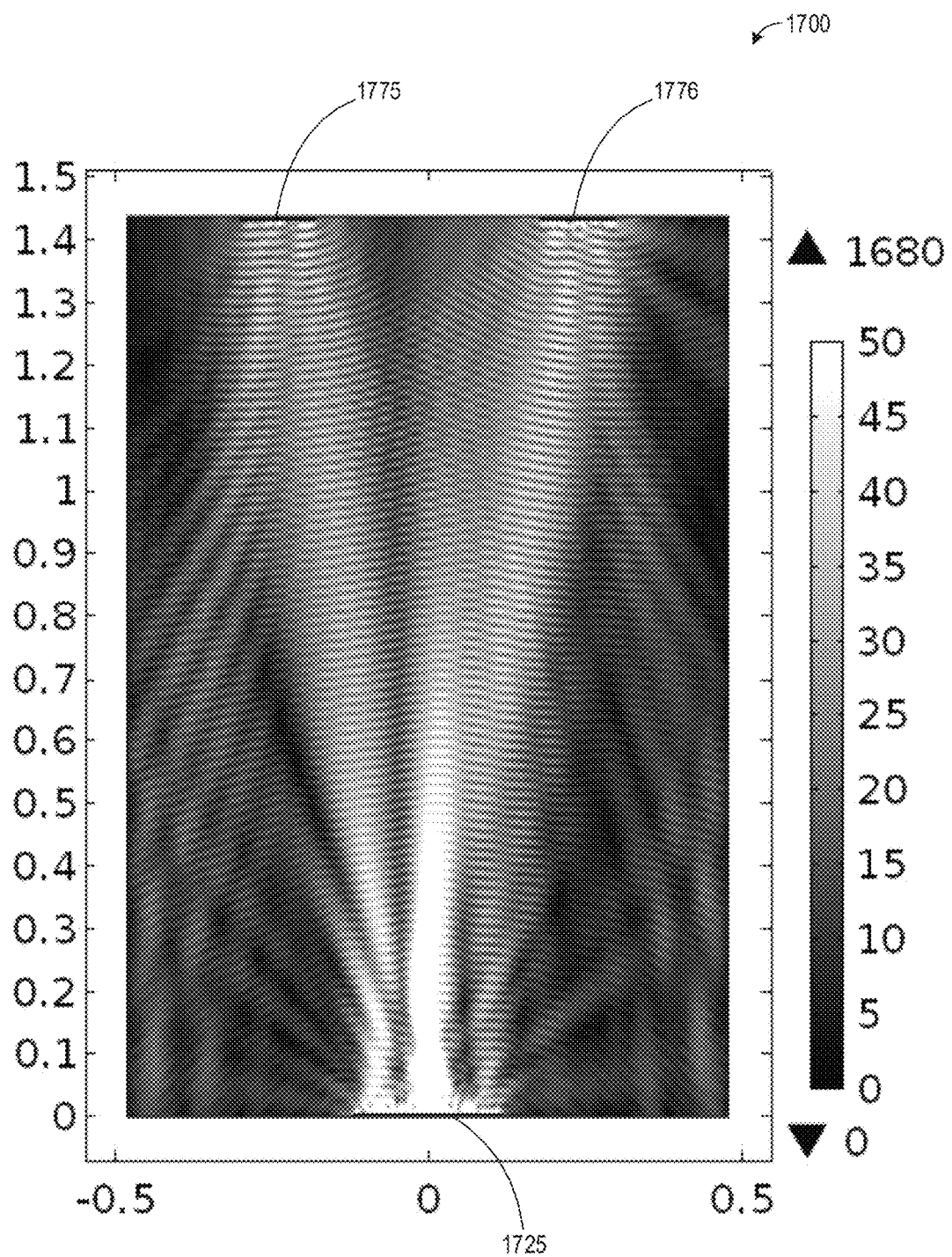
FIG. 17A illustrates a metamaterial surface antenna wireless power transmission system with one metamaterial surface antenna acting as a transmitter and two metamaterial surface antennas acting as receivers, according to one embodiment.

FIG. 17A illustrates a graph of a metamaterial surface antenna wireless power transmission system with one metamaterial surface antenna acting as a transmitter 1725 and two metamaterial surface antennas acting as receivers 1775 and 1776, according to one embodiment. In some embodiments, the transmitter may transmit 50% of the power via split beams 1700 to each receiver 1775 and 1776. In alternative embodiments, the distribution of power may vary based on need, capabilities of both receivers, and/or various economic reasons.

Figure 17B:
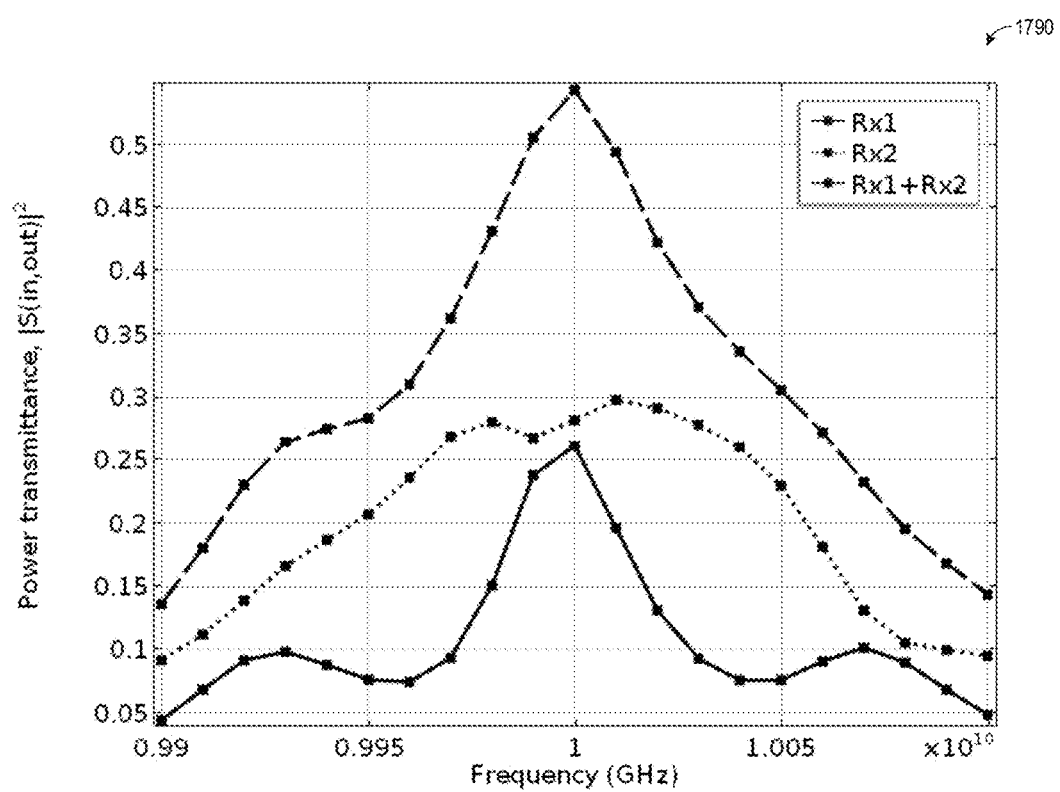
FIG. 17B illustrates a graph of power transmittance relative to frequency for the dual receiver wireless power transmission system of FIG. 17A, according to one embodiment.

FIG. 17B illustrates a frequency-normalized graph 1790 of power transmittance for the dual receiver wireless power transmission system of FIG. 17A, according to one embodiment. As illustrated, each receiver 1775 and 1776 receives power that adds up to nearly 100%.

Figure 18:
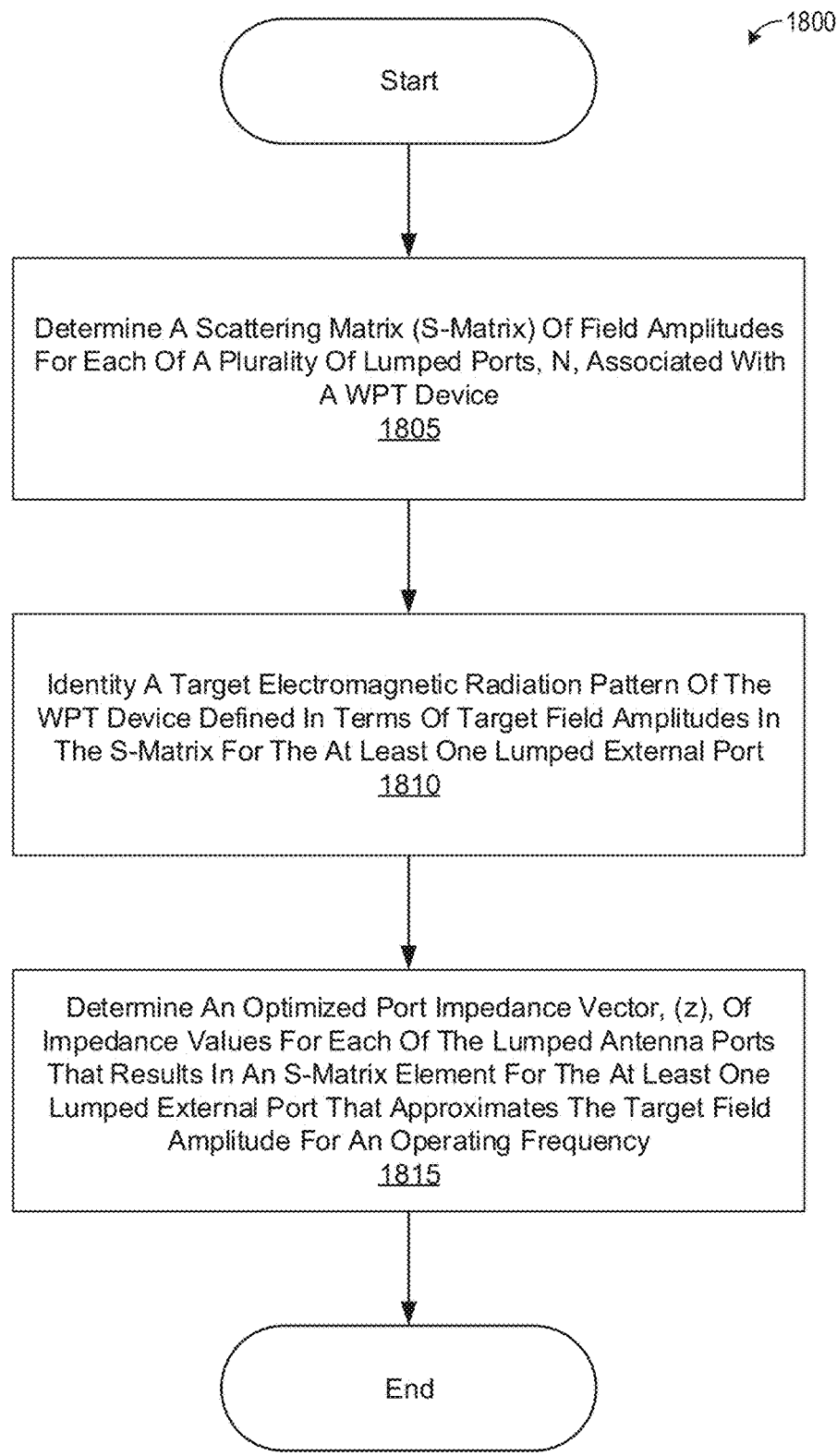
FIG. 18 is a flow chart of a wireless power transfer method utilizing at least one metamaterial surface antenna, according to various embodiments.

FIG. 18 is a flow chart of a wireless power transfer method 1800 utilizing at least one metamaterial surface antenna, according to various embodiments. The method illustrated may be computer-implemented via software, hardware, firmware, and/or a processor or microprocessor. In other embodiments, the method may be implemented using an application specific integrated circuit, a field-programmable gate array, other hardware circuitry, integrated circuits, software, firmware, and/or a combination thereof. As illustrated, an S-Matrix may be determined that includes field amplitudes for each of a plurality of lumped ports, N, associated with a wireless power transfer device, at 1805.

The N lumped ports may include a plurality of lumped antenna ports, $N_a$, wherein each lumped antenna port corresponds to an impedance value of a lumped impedance element in communication with at least one sub-wavelength antenna element of an antenna device, wherein the impedance value of each of the lumped impedance elements is variable based on one or more impedance control inputs, and at least one lumped external port, $N_e$, located physically external to the antenna device. If multiple receivers are used in the wireless power transfer system then multiple spatially separated lumped external ports, $N_e$, may be used. In various embodiments, the S-Matrix may be expressible in terms of an impedance matrix, Z-Matrix, with impedance values, $z_n$, of each of the plurality of lumped ports, N.

Once the S-Matrix has been determined, a target radiation pattern of the antenna device may be defined in terms of target field amplitudes in the S-Matrix for the at least one lumped external port, $N_e$, at 1810. For multiple receivers, the target radiation pattern may include one or more bifurcations of the transmitted beam (as illustrated in FIG. 16A). An optimized port impedance vector, $\{z_n\}$, of impedance values for each of the lumped antenna ports, $N_a$, may then be determined, at 1815, that results in an S-Matrix element for the at least one lumped external port, $N_e$, that approximates the target field amplitude(s) for an operating frequency or operating frequency range.

Figure 19:
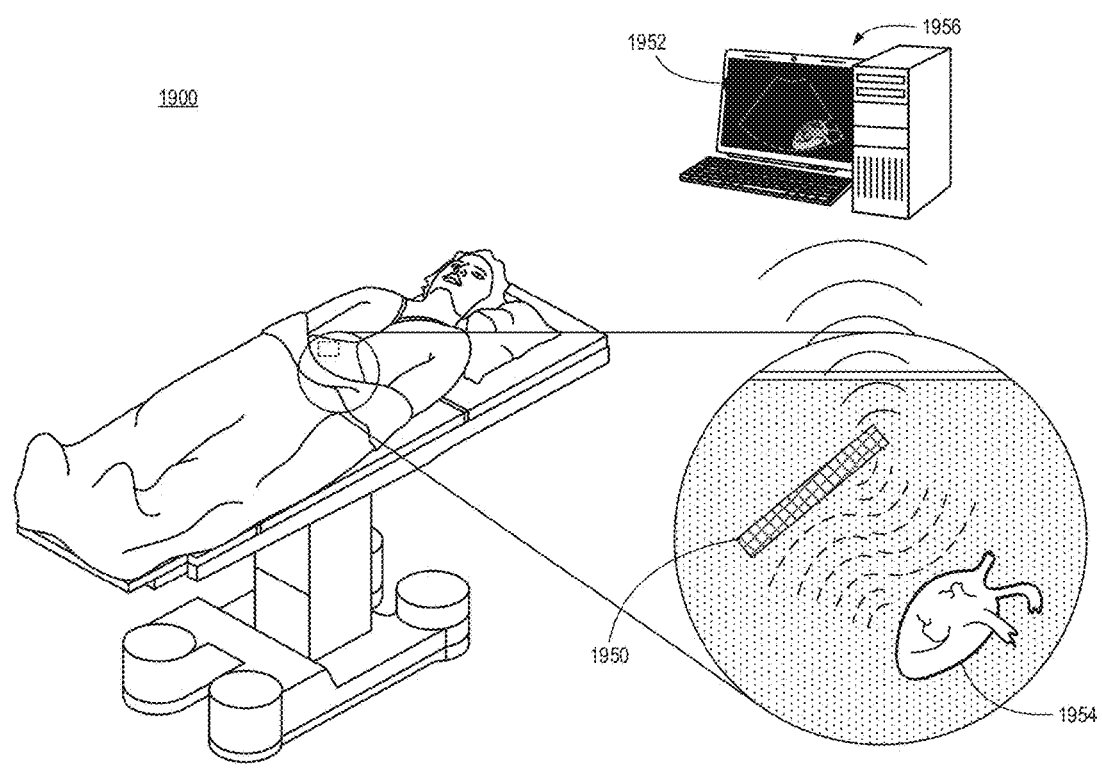
FIG. 19 is an embodiment of a medical system that includes an implantable wireless medical device generating a direct ultrasound.

FIG. 19 is an embodiment of a medical system 1900 that includes an implantable wireless medical device 1950 generating a direct ultrasound 1952. The implantable medical device may or may not include a tunable array of sub-wavelength antenna elements.

According to one embodiment, the medical device 1950 may vibrate via piezoelectricity at a frequency of 1-30 MHz in response to received electromagnetic radiation at one or more locations and at one or more frequencies or modulation patterns. A transducer within the medical device 1950 may convert electromagnetic field oscillations into a mechanical vibration, which directly powers the medical device 1950.

According to one embodiment, the medical device 1950 may include a plurality of piezoelectric elements that produce ultrasonic emissions in response to the mechanical vibration. The medical device 1950 may measure spacing between the piezoelectric elements and a bodily organ 1954 by detecting interference delays and/or angular direction upon receiving sound waves that reflect off of the organ 1954 (e.g. echoes). According to one embodiment, the medical device 1950 may emit a signal to a control system 1956, which may include an interrogator and/or reader to receive the signal. The control system 1956 may convert signal amplitudes and/or delays received by the medical implant into an electric signal.

In other embodiments, the medical device 1950 may solely respond to electromagnetic radiation received from, for example, a dynamically tuned metamaterial antenna comprising a plurality of sub-wavelength elements by emitting ultrasound. The ultrasound echoed off of the organ 1954 may be received by a different external device and communicated to the control system 1956. The control system 1956 may convert electric signals resulting from the echoes and combine data points from the electric signals to produce an ultrasound image 1952. In some embodiments, the image that is generated may be a 3D tomographic image.

Alternatively, the medical device 1950 may perform echo imaging without piezoelectric vibrations. The medical device 1950 may emit an electromagnetic ultrasonic pulse of frequencies into a medium such as an organ 1954 or body cavity. The emitted pulse then propagates through a medium of interest, wherein the pulse experiences attenuation and diffraction depending on the surrounding objects with which the pulse contacts. The wavelengths of the electromagnetic pulse may be shorter than the size of the organ to be imaged such that the image may show both near-field and far-field reflections, according to one embodiment. Once the electromagnetic field is scattered, the wavelengths are reflected back to the medical device 1950 (or another external or internal device) such that an image can be formed corresponding to the received echoes. According to various embodiments, the medical implant 1950 may either transmit the information received to the control center 1956 and/or include mechanisms whereby the medical device 1950 itself may calculate the distance of the surrounding objects based on the time it takes the echoes to return.

Figure 20A:
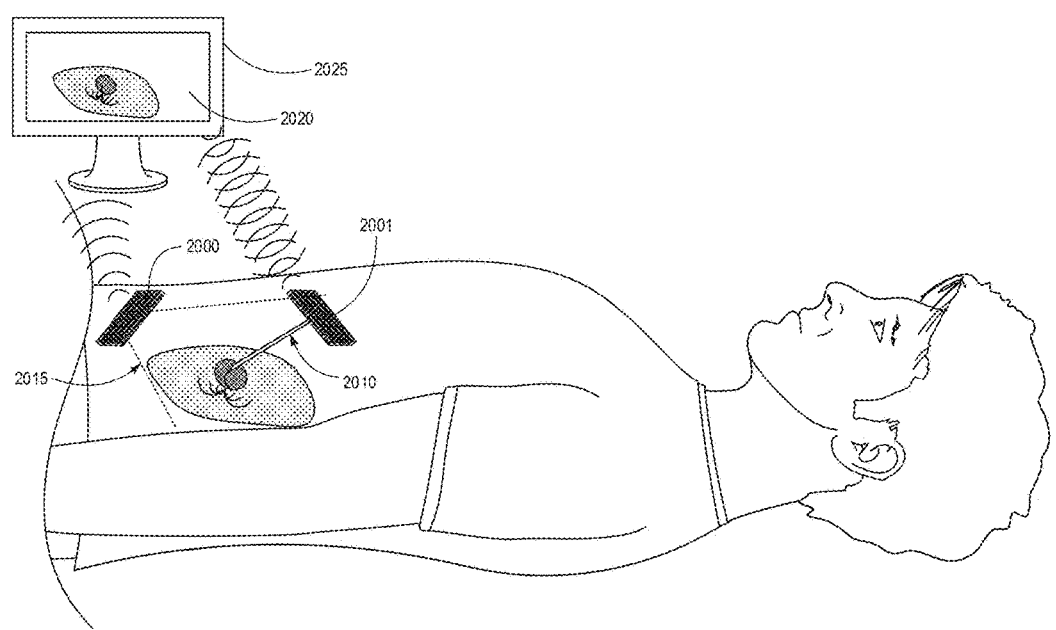
FIG. 20A depicts two wireless implantable medical devices with arrays of sub-wavelength antenna elements and associated variable impedance lumped elements for ablation and ultrasound imaging, respectively.

FIG. 20A depicts two wireless implantable (or external) medical devices 2000 and 2001 with arrays of sub-wavelength antenna elements and associated variable impedance lumped elements. A first medical device 2001 is configured to perform beam patterning ablation 2010, and the second medical device 2000 is configured to utilize a beamforming ultrasound 2015 to provide instantaneous imaging of the ablation process. The beam patterning ablation 2010 may be precisely restricted to a particular location within a human or animal body. According to one embodiment, the medical implant 2001 that performs ablation focuses electromagnetic fields with a high level of accuracy by creating a sharp discontinuity that shapes the electromagnetic fields, such that it is able to ablate internal portions of the human with pinpoint accuracy. In some embodiments, such ablation may occur at the junction of two or more beams formed by two or more medical ablation devices. A beamforming ultrasound may be utilized to image the ablation process by converting sound vibrations into electric signals, which an imaging device 2025 then collects and displays as an image 2020.

Figure 20B:
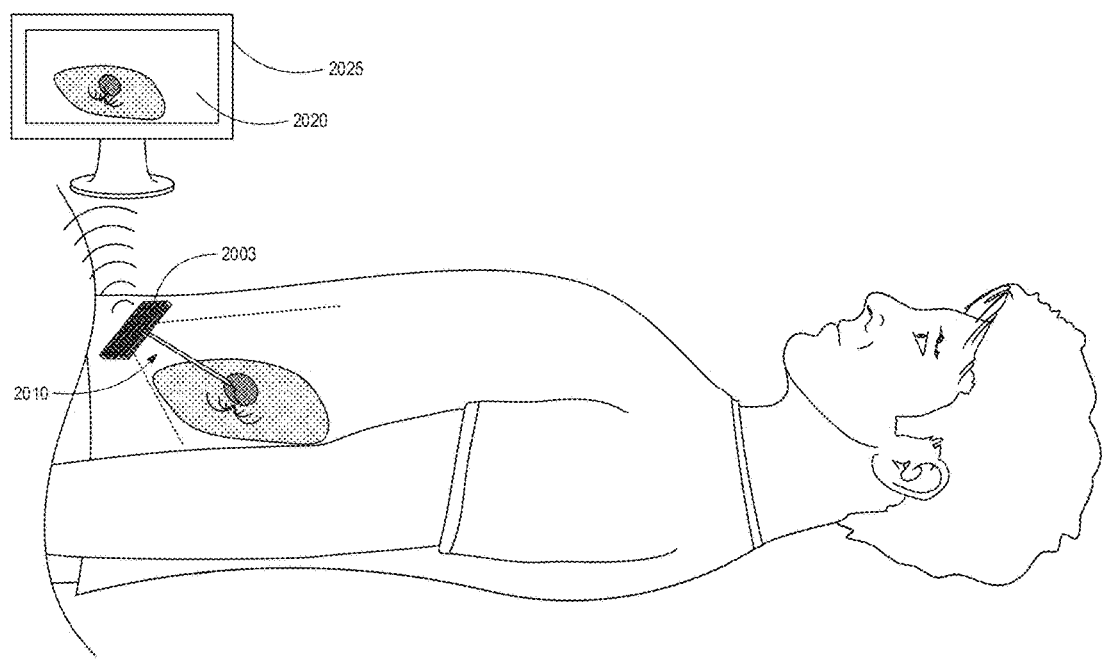
FIG. 20B depicts an embodiment of a medical implant simultaneously performing both the ablation and ultrasound imaging.

FIG. 20B depicts an embodiment of a medical implant 2003 simultaneously performing both the ablation and ultrasound imaging (e.g., potentially in a switched mode at varying time-based intervals that is effectively simultaneous). Again, an imaging device 2025 displays the image 2020. The medical implant 2000 may include multiple antenna arrays with tunable metamaterial that simultaneously perform different functions, or a single antenna array that is time-switched to function as more than one device, according to various embodiments.

Figure 21:
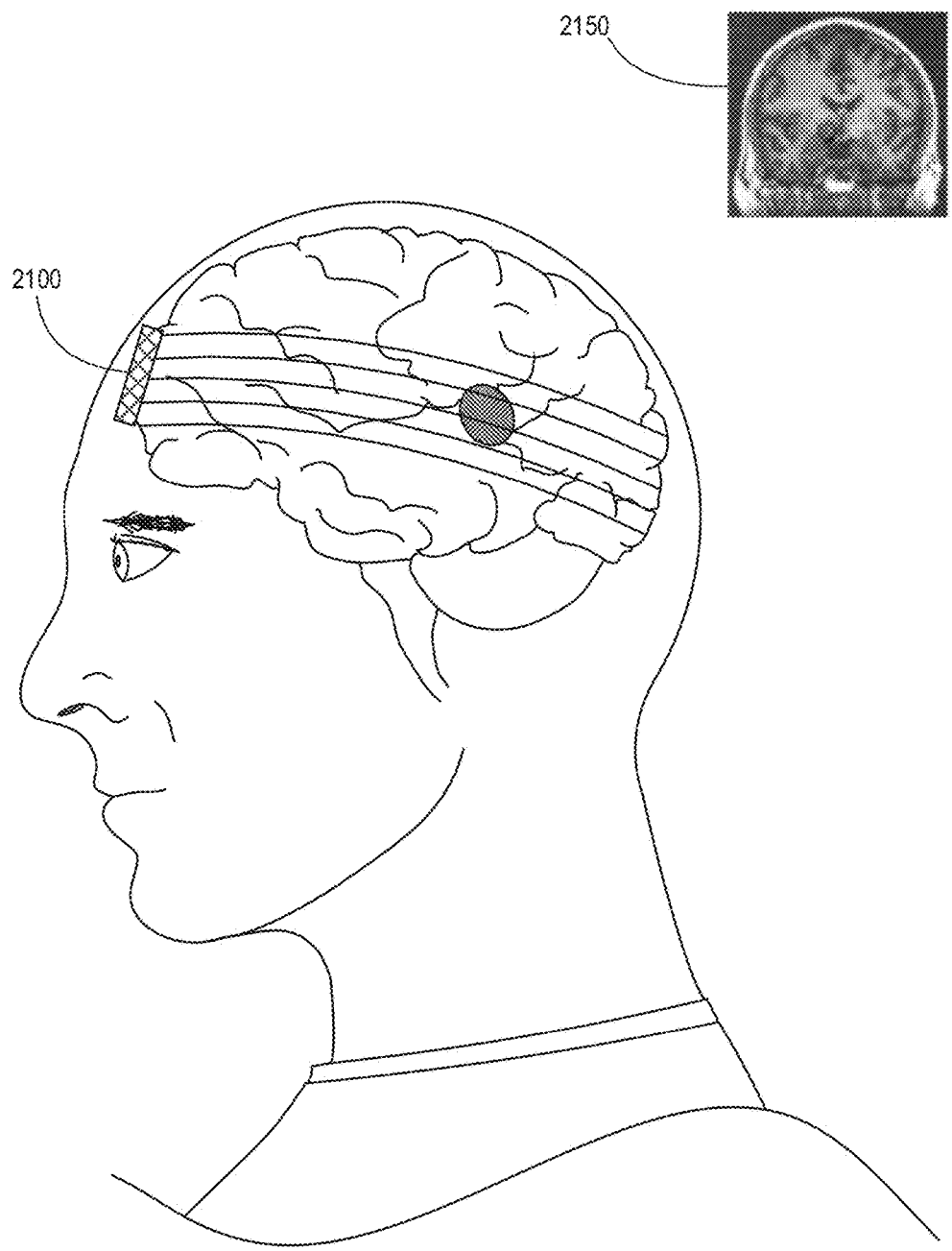
FIG. 21 depicts a wireless implantable medical device employing a curved beamforming technique, according to one embodiment, to produce an MRI image.

FIG. 21 depicts a wireless implantable medical device 2100 employing a curved beamforming antenna, according to one embodiment, to produce an image 2150. In a curved beamforming process, a medical device 2100 may produce very thinly curved electromagnetic fields, according to one embodiment, that generate an image 2150 from nonlinear gradient curve slices. Such curved slices may be spherical, ellipsoidal, parabolic, or of any shape that includes a nonlinear or curved surface. The curved surfaces may be of an arbitrarily small diameter such that only a select portion of a human or animal body may be imaged. The electromagnetic fields may be customized to focus on a frequency-selective surface with substantially less background noise relative to signals. Such an embodiment may be used to produce or enhance MRI images.

Figure 22:
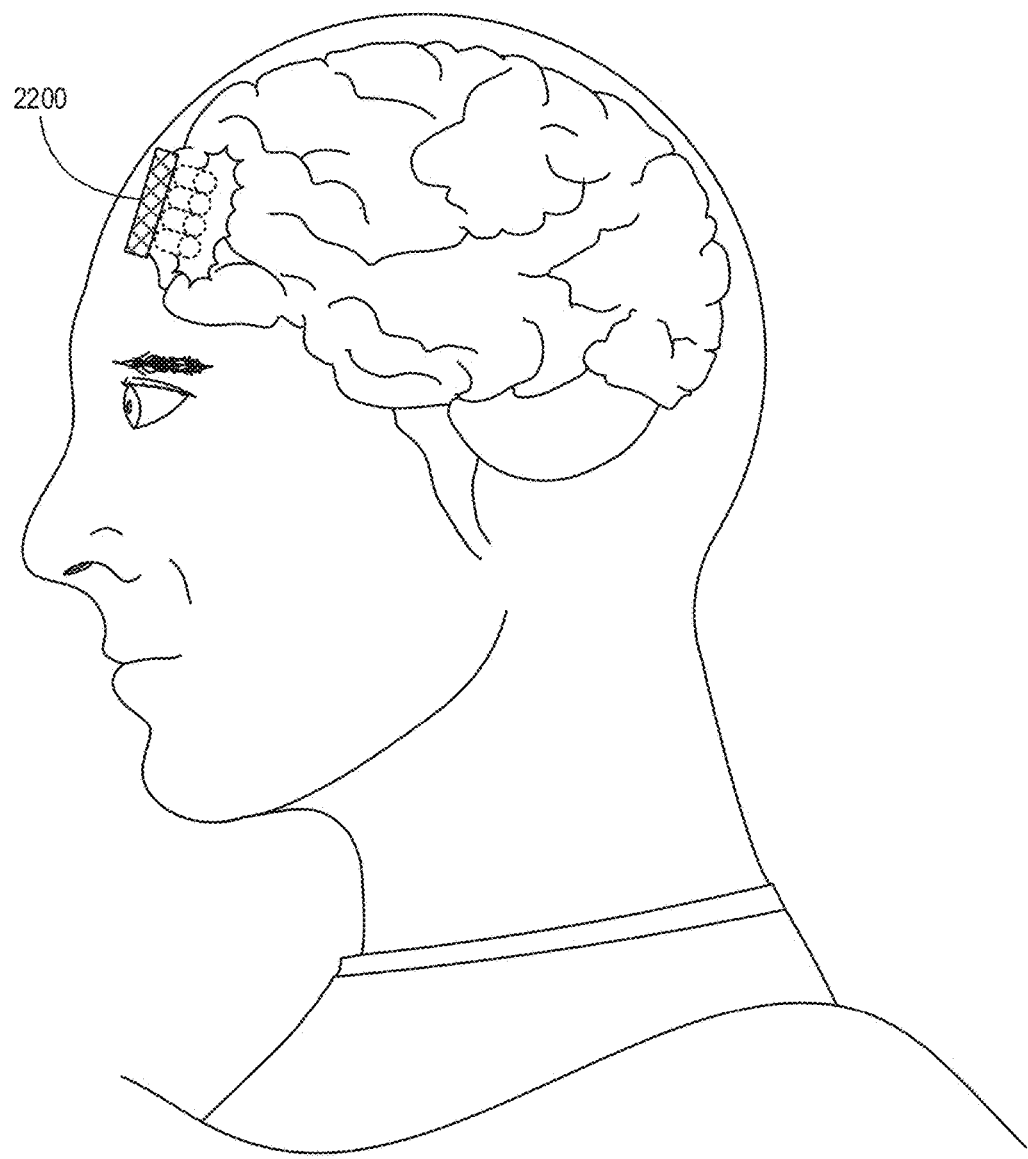
FIG. 22 illustrates a medical device conducting magnetic brain stimulation via controlled beamforming, according to one embodiment.

FIG. 22 illustrates a medical device 2200 conducting magnetic brain stimulation via controlled beamforming, according to one embodiment. A wireless implantable (or externally attached) medical device 2200 may generate electromagnetic fields to stimulate peripheral nerves, electrical pulses within a heart, a brain, central nervous system, and/or any number of tissues that have electrical signaling within a human or animal body. According to one embodiment, the medical device 2200 includes one or more antenna arrays with tunable metamaterial, which produces dynamic electromagnetic fields. The electromagnetic fields utilize magnetic induction to excite electric currents within a particular location of a body. For example, the medical device 2200 may be implanted or partially implanted and configured for transcranial magnetic stimulation.

Figure 23:
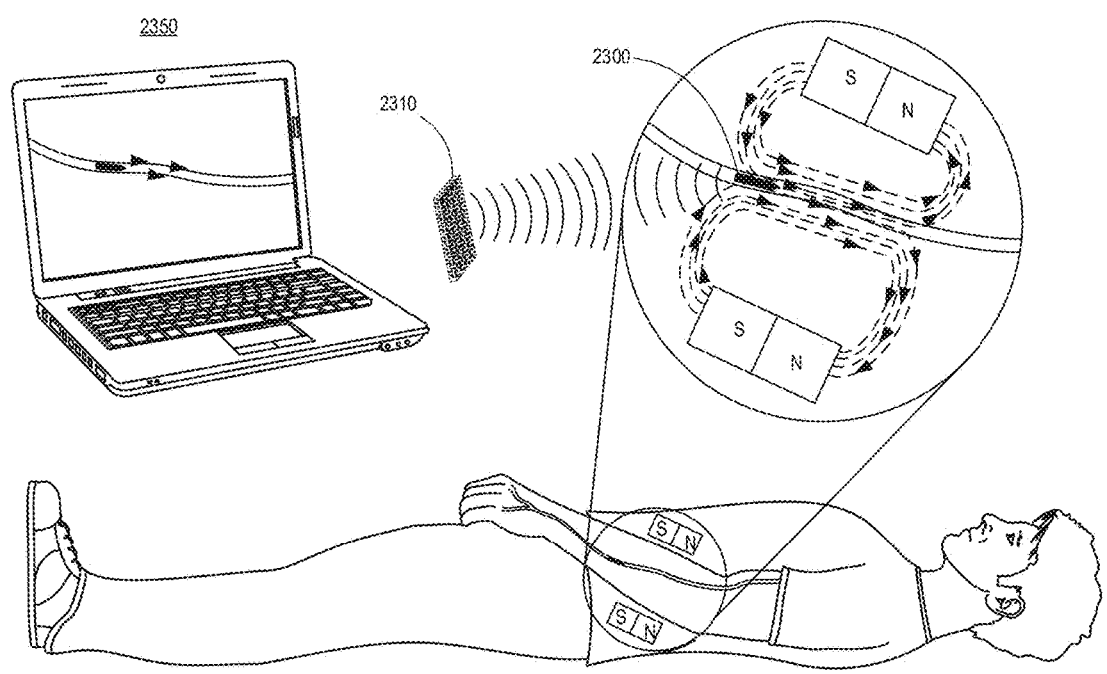
FIG. 23 illustrates propulsion and control of a wireless implantable medical device via controlled beamforming.

FIG. 23 illustrates propulsion of a wireless implantable medical device 2300 through one or more of the beamforming techniques described herein, according to various embodiments. An antenna 2310 may include a plurality of sub-wavelength antenna elements that are optimally tuned to produce a target radiation and/or field pattern. Impedance values may be dynamically tuned to attain a specific target radiation pattern, as described herein. The electromagnetic radiation pattern may be converted by the medical device 2300 into mechanical forces and/or torques to propel and/or rotate the medical device 2300. In one embodiment, the medical device 2300 may utilize electromagnetic fields as a power source to power motive systems. The direction of the power-transferring electromagnetic fields may be controlled such that movement of the medical implant is coordinated simultaneously.

The medical device 2300 may be included in a medical system 2350 wherein the position and orientation of a medical device 2300 is tracked. The medical system 2350 may include a receiver of electromagnetic radiation, an imaging device, and/or a transmitter of electromagnetic radiation. In some embodiments, the medical system 2350 may superimpose an image of the medical device 2300 within a body cavity, blood vessel, etc. to provide a frame of reference for positioning and orientation of the medical implant.

The medical system 2350 may further comprise one or more sensors to detect an electromagnetic field and/or produce signals corresponding to the electromagnetic radiation formed by the antenna system. For example, the sensors may include coils connected in series within the medical implant. The medical system 2350 may thereby infer the position and orientation of the medical device 2300.

FIG. 23 illustrates a zoomed view to show the effective magnetic forces produced by the beam-formed electromagnetic energy from the antenna 2310.

The embodiments of the systems and methods provided within this disclosure are not intended to limit the scope of the disclosure, but are merely representative of possible embodiments. In addition, the steps of a method do not necessarily need to be executed in any specific order, or even sequentially, nor do the steps need to be executed only once. As described above, descriptions and variations described in terms of transmitters are equally applicable to receivers, and vice versa.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

What is claimed is:

1. A wireless medical device system, comprising: a first medical device for at least partial implantation within a patient to selectively perform a function within the patient, modeled as at least one lumped external port; and an external interface device for wirelessly interfacing with the first medical device to cause the first medical device to perform the function within the patient, the external interface device comprising: an antenna system with a plurality of sub-wavelength antenna elements in communication with a plurality of selectively variable impedance elements, and a control system to control radiation patterning of the antenna system based on a scattering matrix (S-Matrix) of electromagnetic field amplitudes for each of a plurality of lumped ports, wherein the lumped ports include: a plurality of lumped antenna ports with impedance values corresponding to the impedance values of each of the plurality of selectively variable impedance elements; and the at least one lumped external port corresponding to the first medical device at least partially implanted within the patient.

2. The system of claim 1, wherein the external interface device is configured to wirelessly interface with the first medical device to cause the first medical device to move from a first location within the patient to a second location within the patient.

3. The system of claim 1, wherein the external interface device is configured to wirelessly interface with the first medical device to cause the first medical device to rotate from a first orientation within the patient to a second orientation within the patient.

4. The system of claim 1, wherein the external interface device is configured to wirelessly interface with the first medical device to provide programming data to the first medical device to change a manner in which the function is performed within the patient.

5. The system of claim 1, wherein the external interface device is configured to wirelessly interface with the first medical device to provide power to the first medical device.

6. The system of claim 5, wherein the external interface device is configured to provide power to the first medical device to enable it to perform the function.

7. The system of claim 5, wherein the external interface device is configured to provide power to the first medical device to charge one of a battery and a capacitor of the first medical device.

8. The system of claim 5, wherein the first medical device can only perform the function when powered by the external interface device.

9. The system of claim 1, wherein first medical device and the external interface are part of a radiofrequency multiple input, multiple output (MIMO) system.

10. The system of claim 1, wherein the first medical device collects medical data from within the patient and, in response to a query from the external interface device, transmits the collected data to the external interface device.

11. The system of claim 1, wherein the first medical device comprises an ultrasonic transducer and the function performed by the first medical device comprises at least one of transmitting and receiving ultrasonic energy from within the patient.

12. The system of claim 1, wherein the first medical device comprises an ultrasonic transducer to receive ultrasound from within a patient and the function performed by the first medical device comprises transmitting a baseband radiofrequency to the external interface device modulated by received ultrasound.

13. The system of claim 1, wherein the first medical device comprises an ultrasonic transducer to produce ultrasound from within a patient in response to electromagnetic energy received from the external interface device.

14. The system of claim 1, wherein the first medical device comprises an implanted brain stimulation device to perform a function of producing electromagnetic fields within the central nervous system of the patient.

15. The system of claim 1, wherein the first medical device comprises a radiofrequency ablation device to perform the function of ablation within the patient.

16. The system of claim 1, wherein the wherein the first medical device comprises a radiofrequency focus device to perform the function of modifying a focus of electric fields proximate the first medical device.

17. The system of claim 1, wherein the wherein the first medical device is configured to receive power from the external interface device to perform the function within the patient concurrent with at least one of:
instructions for performing the function,
control signals to cause the first medical device to move or rotate, and
direct magnetically induced propulsive forces to move or rotate the first medical device.

18. The system of claim 1, wherein first medical device comprises a magnetic resonance imaging (MRI) device configured to receive electromagnetic energy from the external interface device to cause the first medical device to perform a function associated with radiofrequency pulse shaping for MRI imaging.

19. The system of claim 1, wherein the antenna system further comprises a plurality of control inputs to allow for the selection of an impedance value for each of the selectively variable impedance elements.

20. The system of claim 19, wherein the impedance value of at least one of the selectively variable impedance elements is variable based on one or more mechanical impedance control inputs.

21. The system of claim 1, wherein the S-Matrix is expressible in terms of an impedance matrix, Z-Matrix, with impedance values of each of the plurality of lumped ports.

22. The system of claim 1, wherein the control system is configured to control radiation patterning of the antenna system by:
identifying a target electromagnetic radiation pattern of the wireless power transmitter defined in terms of target electromagnetic field amplitudes in the S-Matrix for the at least one lumped external port;
determining an optimized port impedance vector $\{z_n\}$ of impedance values for each of the lumped antenna ports that results in an S-Matrix element for the at least one lumped external port that approximates the target electromagnetic field amplitude for an operating frequency; and
adjusting at least one of the plurality of variable impedance control inputs to modify at least one of the impedance values of at least one of the plurality of variable lumped impedance elements based on the determined optimized $\{z_n\}$ of the impedance values for the lumped antenna ports.

23. The system of claim 1, wherein a physical location of the at least one lumped external port is associated with a propagation channel that includes an electromagnetically reflective surface.

24. The system of claim 1, wherein at least one of the lumped external ports is associated with a multipath propagation channel that includes a refractive object.

25. The system of claim 1, wherein each of the plurality of sub-wavelength antenna elements is configured to scatter received electromagnetic fields originating from a source external to the antenna system.

26. The system of claim 1, wherein the plurality of sub-wavelength antenna elements is connected to a transmission line and wherein each of the sub-wavelength antenna elements is configured to scatter electromagnetic fields received from the transmission line.

27. The system of claim 1, wherein the plurality of sub-wavelength antenna elements receives electromagnetic energy from an external antenna comprising at least one of a short dipole antenna, a resonant dipole antenna, a half-wavelength dipole antenna, a loop antenna, a resonant loop antenna, a spiral antenna, a patch antenna, a horn antenna, and a dish antenna.

28. The system of claim 1, wherein each of the sub-wavelength antenna elements comprises an antenna element with a maximum dimension that is less than half of a wavelength of the smallest frequency in an operating frequency range.

29. The system of claim 1, wherein a separation between each of the sub-wavelength antenna elements does not exceed half of a wavelength of a frequency within an operating frequency range.

30. The system of claim 1, wherein the plurality of sub-wavelength antenna elements is divided into at least two groups,
wherein sub-wavelength antenna elements within each group are separated from one another by no more than half of an operating wavelength, and
wherein each group of sub-wavelength antenna elements is spatially separated from each other group of sub-wavelength antenna elements by at least a distance exceeding that of half of the operating wavelength.

31. The system of claim 1, wherein the first medical device comprises an at least partially implantable antenna system with a plurality of sub-wavelength antenna elements in communication with a plurality of selectively variable impedance elements, and
an at least partially implantable control system to control radiation patterning of the at least partially implantable antenna system based on a scattering matrix (S-Matrix) of electromagnetic field amplitudes for each of a plurality of lumped ports, wherein the lumped ports include:
a plurality of lumped antenna ports with impedance values corresponding to the impedance values of each of the plurality of selectively variable impedance elements of the at least partially implantable antenna system; and
at least one lumped external port corresponding to at least one of the external interface device and a location within the patient.

32. The system of claim 1, wherein the wireless power receiver comprises a battery charging station.

33. The system of claim 1, wherein the at least one lumped external port comprises a cell within a battery.

34. The system of claim 1, wherein the at least one lumped external port is connected to an input port of a rectifying circuit.

35. The system of claim 1, wherein the at least one lumped external port is connected to an input port of a transformer circuit.

36. The system of claim 1, wherein at least some of the sub-wavelength antenna elements comprise resonating elements.

37. The system of claim 1, wherein at least some of the sub wavelength antenna elements comprise a metamaterial.

38. The system of claim 1, wherein the external interface further comprises a common transmission line (TL) coupled to the selectively variable impedance elements of the antenna system.

39. The system of claim 1, wherein the first medical device is in the far-field of the antenna system of the external interface.

40. The system of claim 1, wherein the first medical device is in the near-field of the antenna system of the external interface.

41. An implantable medical device, comprising:
a receiver to wirelessly receive electromagnetic energy from an external interface device while the medical device is at least partially implanted within a patient, the received electromagnetic energy providing at least one of wireless power and wireless control signals to cause the medical device to perform a function while at least partially implanted within the patient based on at least one target location within the patient modeled as at least one lumped external port, wherein the receiver is further configured to:
receive the electromagnetic energy from an antenna system with a plurality of sub-wavelength antenna elements in communication with a plurality of selectively variable impedance elements,
wherein the antenna system is configured to be controlled by a control system configured to control radiation patterning of the antenna system based on a scattering matrix (S-Matrix) of electromagnetic field amplitudes for each of a plurality of lumped ports, wherein the lumped ports include:
a plurality of lumped antenna ports with impedance values corresponding to the impedance values of each of the plurality of selectively variable impedance elements; and
the at least one lumped external port corresponding to the at least one target location within the patient.

42. A method, comprising: at least partially implanting a first medical device within a patient to selectively perform a function within the patient, wherein the first medical device is modeled as at least one lumped external port; and wirelessly interfacing an external interface device with the first medical device to cause the first medical device to perform the function within the patient, wherein the external interface device includes an antenna system with a plurality of sub-wavelength antenna elements in communication with a plurality of selectively variable impedance elements, and a control system to control radiation patterning of the antenna system based on a scattering matrix (S-Matrix) of electromagnetic field amplitudes for each of a plurality of lumped ports, wherein the lumped ports include a plurality of lumped antenna ports with impedance values corresponding to the impedance values of each of the plurality of selectively variable impedance elements; and the at least one lumped external port corresponding to the first medical device at least partially implanted within the patient.

* * * * *